US009092839B2

(12) United States Patent
Koziarz et al.

(10) Patent No.: US 9,092,839 B2
(45) Date of Patent: Jul. 28, 2015

(54) ENCODING OF RASTERISED GRAPHIC OBJECTS

(71) Applicant: CANON KABUSHIKI KAISHA, Tokyo (JP)

(72) Inventors: Krzysztof Adam Koziarz, Denistone (AU); Matthew Thomas Imhoff, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 13/872,562

(22) Filed: Apr. 29, 2013

(65) Prior Publication Data
US 2013/0294692 A1 Nov. 7, 2013

(30) Foreign Application Priority Data
May 1, 2012 (AU) ................................ 2012202546

(51) Int. Cl.
G06K 9/34 (2006.01)
G06T 9/00 (2006.01)
(52) U.S. Cl.
CPC ........................................ *G06T 9/00* (2013.01)
(58) Field of Classification Search
CPC ... G03F 7/70691; G03F 9/7011; G06T 11/60; G06T 9/00; G06F 3/1212; G06F 3/1215; G06K 15/02; G06K 15/181
USPC ........... 382/173, 171, 164, 190, 232; 358/1.9, 358/3.2; 347/14, 19
See application file for complete search history.

(56) References Cited

U.S. PATENT DOCUMENTS

| 5,001,575 | A | 3/1991 | Nakahara |
| 5,119,442 | A | 6/1992 | Brown |
| 6,259,818 | B1 | 7/2001 | Kim et al. |
| 6,728,412 | B1 | 4/2004 | Vasylyev |
| 8,350,868 | B2 * | 1/2013 | Chang et al. .................. 345/592 |
| 2005/0174345 | A1 * | 8/2005 | Wittenbrink et al. ......... 345/418 |
| 2006/0038835 | A1 * | 2/2006 | Cao .............................. 345/655 |

FOREIGN PATENT DOCUMENTS

| AU | 2006252249 A1 | 7/2008 |
| EP | 0369301 A2 | 5/1990 |

OTHER PUBLICATIONS

Leo Dorst and Arnold W. M. Smeulders, Discrete Representation of Straight Lines, IEEE Transactions on Pattern Analysis and Machine Intelligence, Jul. 1984, 6(4):450-463, IEEE Computer Society, Los Alamitos, CA.
Toru Kaneko and Masashi Okudaira, Encoding of Arbitrary Curves Based on the Chain Code Representation, IEEE Transactions on Communications, Jul. 1985, 33(7):697-707, IEEE Communications Society, Vancouver, BC, Canada.

* cited by examiner

*Primary Examiner* — Ali Bayat
(74) *Attorney, Agent, or Firm* — Canon U.S.A., Inc. IP Division

(57) ABSTRACT

A method of encoding an edge of a graphical object. The edge is segmented into a plurality of straight segments. A sequence of offset values representing one of the plurality of segments from a starting position, is determined. At least one of the offset values in the sequence is modified to obtain a modified sequence of offset values. The method determines a precision level at which the modified sequence is to be encoded to represent the segment. The precision level determines a size of a portion of offset values to be repeated in the sequence of offset values.

14 Claims, 14 Drawing Sheets

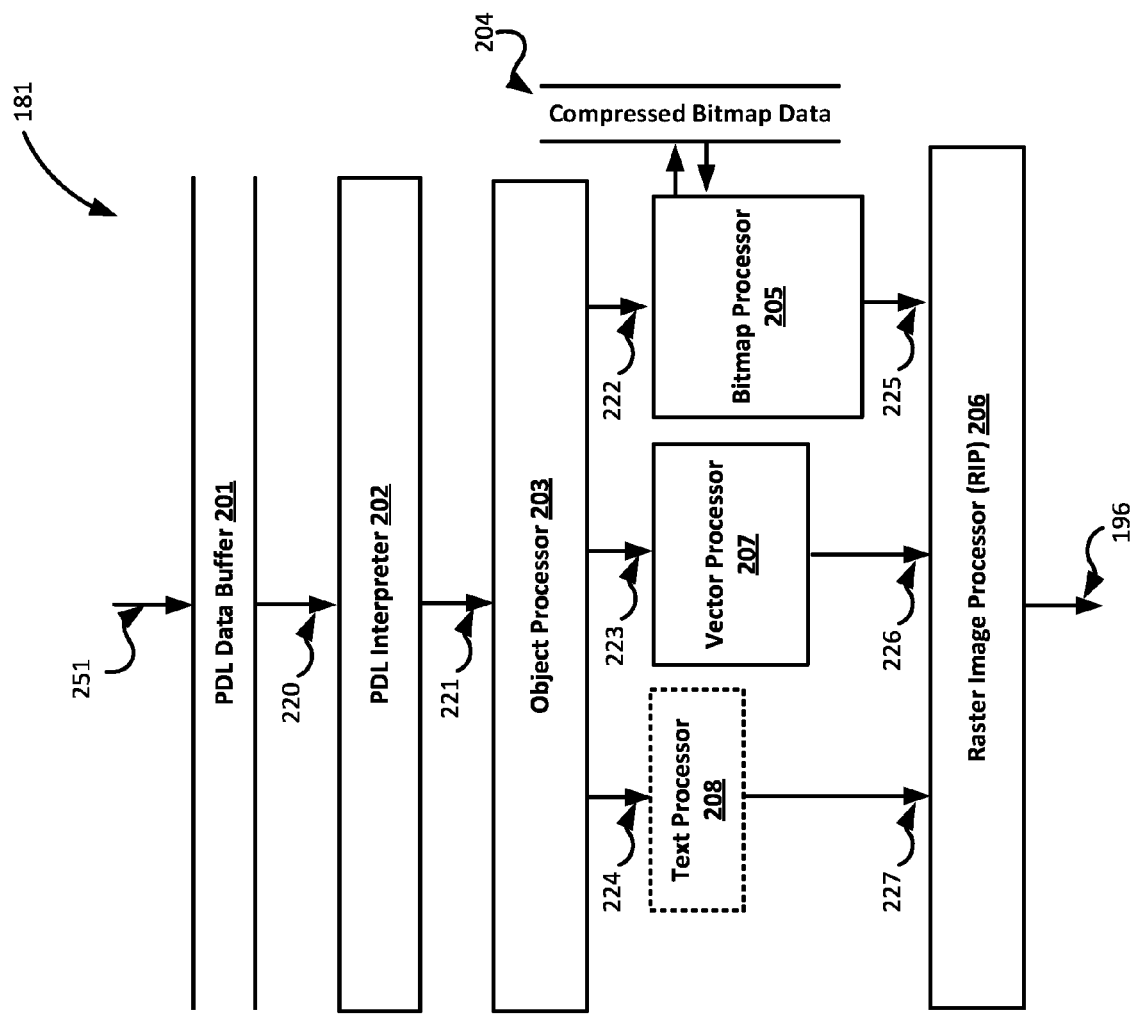

ENCODING OF RASTERISED GRAPHIC OBJECTS

REFERENCE TO RELATED PATENT APPLICATION(S)

This application claims the benefit under 35 U.S.C. §119 of the filing date of Australian Patent Application No. 2012202546, filed 1 May 2012, hereby incorporated by reference in its entirety as if fully set forth herein.

FIELD OF THE INVENTION

The present invention relates generally to image processing and, in particular, to processing a vector image into a corresponding raster image. The present invention also relates to a method and apparatus for encoding an edge of a graphical object, and to a computer program product including a computer readable medium having recorded thereon a computer program for encoding an edge of a graphical object.

BACKGROUND

There are several known computer applications that require graphic objects to be transformed from vector representation to raster representation. For example, such a transformation is needed to display graphic objects on a display device, such as a computer monitor, or to display graphic objects on a page using a printing device, such as a laser beam printer. A vector representation of a graphic object is a description of the graphic object in terms of an object outline, typically in the form of straight lines (vectors). Conversely, a raster representation of a graphic object consists of pixels needed to render the graphic object on the display device. The pixels of the raster representation are part of a pixel grid of the display device. The pixel grid defines locations of the pixels and resolution of those pixels, known as the device resolution.

Graphic objects in a vector representation are known as vector objects. One method of transforming a vector object to a raster representation is referred to as Bresenham's algorithm. For each vector of a vector object, Bresenham's algorithm determines pixels that correspond to the intersection of the vector with each scanline of the pixel grid. A scanline is a row of pixels in the pixel grid of the display device. Once the position of the start of the vector is known, the pixel at the intersection of the vector with each scanline is determined by incrementing the position at a previous scanline intersection by an offset that represents the slope of the vector. The offset contains an integer part and a fractional part. The integer part determines the pixels that are activated by the vector and the fractional part accumulates an error value. Once the error value exceeds a certain threshold the integer part is incremented an additional time.

Bresenham's algorithm is also used to determine the appearance of an image when the image is rendered at device resolution. The image to be rendered to the pixel grid of the device is known as a source image. The rendered image at device resolution is known as a destination image. Due to differences between the resolution of the source image and the device resolution, and the image transformation (translation, scaling and/or rotation) to be applied to the source image, mappings between source image pixels and destination image pixels (known as pixel mappings) are not always straightforward. Using Bresenham's algorithm, the location of the source image pixel that corresponds to a destination image pixel may be determined by incrementing the location of the previous source image pixel by an offset that is calculated from the image transformation. Again, the offset contains an integer part which determines the discrete mapping from destination image pixels to source image pixels; and a fractional part which accumulates an error value.

The methods discussed above require offset and error accumulation calculations to be performed for every pixel in a destination image.

One alternative to using Bresenham's algorithm for rendering images, when image transformation contains no rotation, is to pre-calculate the pixel mappings for one row of destination image pixels in the horizontal direction and one column of destination image pixels in the vertical direction. For cases where the image transformation does not contain any rotation, the two sequences of pixel mappings are sufficient to determine the location of the source image pixel for any destination image pixel, avoiding the need to calculate the source image pixel for every destination image pixel in the destination image. However, such a method requires additional memory to store sequences of pixel mappings for the width and height of the destination image.

A similar method may be used when drawing vector objects. In such a method, pixel offsets for each scanline of a vector may be predetermined. Like the above method for predetermination of sequences of pixel mappings, such a predetermination method reduces the amount of calculations required to render the vectors. However, such a method also generates a large amount of offset data that must be stored in memory.

Thus, a need clearly exists for an encoding method that represents a mapping between vector objects or source image pixels and destination image pixels, that is faster and more efficient than the prior art.

SUMMARY

It is an object of the present invention to substantially overcome, or at least ameliorate, one or more disadvantages of existing arrangements.

Disclosed are arrangements, referred to as a Scan-based Edge Approximation (SBEA) arrangement and a Scan-based Edge Encoding (SBEE) arrangement that seek to address the above problems by converting vectors of an input vector object into an efficient representation of a rasterised object.

Also disclosed is an arrangement referred to as a Scaling Sequence Encoding (SSE) arrangement, which describes the process of transforming a source image into a destination image.

According to one aspect of the present disclosure, there is provided a method of encoding an edge of a graphical object, said method comprising:
  segmenting the edge into a plurality of straight segments;
  determining a sequence of offset values representing one of the plurality of segments from a starting position;
  modifying at least one of the offset values in the sequence to obtain a modified sequence of offset values; and
  determining a precision level at which the modified sequence is to be encoded to represent the segment, wherein said precision level determines a size of a portion of offset values to be repeated in the sequence of offset values.

According to another aspect of the present disclosure, there is provided a method of encoding a scaling factor of an image, said method comprising:
  determining a sequence of pixel mapping values representing the scaling factor;
  modifying at least one pixel mapping value in the sequence of pixel mapping values to obtain a modified sequence of pixel mapping values; and determining a precision level at which the modified sequence is to be encoded to represent the scaling factor, wherein said precision level determines size of a portion of offset values repeated in the sequence of pixel mapping values.

According to still another aspect of the present disclosure, there is provided an apparatus for implementing any one of the aforementioned methods.

According to still another aspect of the present disclosure, there is provided a system for implementing any one of the aforementioned methods.

According to still another aspect of the present disclosure, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the invention will now be described with reference to the drawings, in which:

FIG. 2 is a schematic block diagram showing a client print manager module for rendering the graphic objects of a page to pixels;

DETAILED DESCRIPTION INCLUDING BEST MODE

Figure 1A:
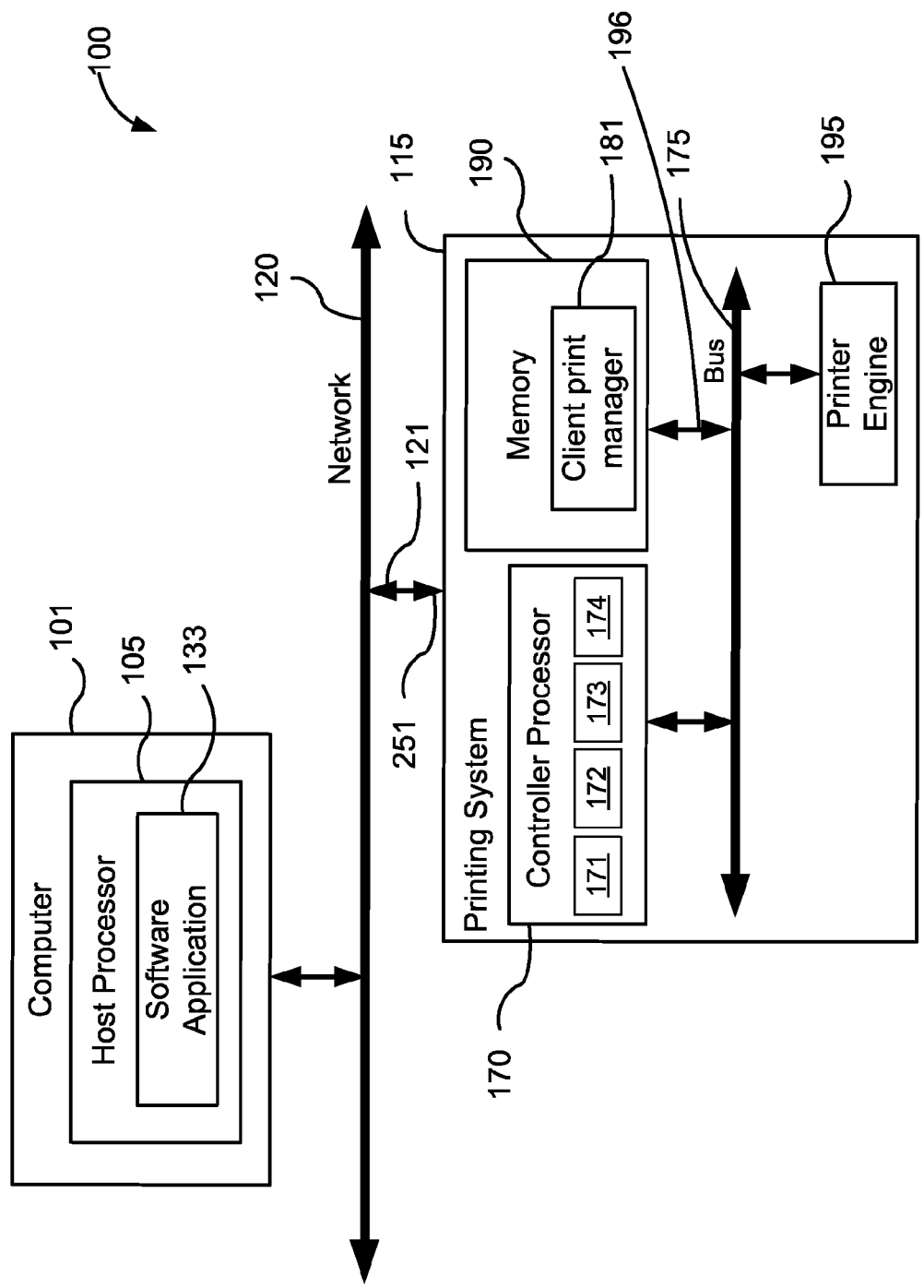
FIG. 1A shows a schematic block diagram of a multi-processor printing system for printing graphic objects of a page.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a schematic block diagram of a pixel rendering system 100 for rendering graphic objects. The pixel rendering system 100 comprises a computer module 101 connected to a printing system 115 through a communications network 120. The network 120 may be a wide-area network (WAN), such as the Internet, a cellular telecommunications network, or a private WAN. The network 120 may comprise multiple computers. Alternatively, the network 120 may be a simple connection between a single computer module (e.g., 101) and a printing system (e.g., 115).

The computer module 101 comprises at least one host processor 105 for executing a software application 133. The software application 133 may be a word processor or graphical software application. The software application 133 typically provides a printable page 251, via a connection 121, to a printing system 115 for printing to a print medium, such as a paper sheet. The printable page 251 may be part of a document having many pages. The printable page 251 contains all information necessary for printing the page 251. The printable page 251 is typically provided in the form of a description of the page to be printed, specified using a high-level Page Description Language (PDL), such as Adobe® PDF or Hewlett-Packard® PCL.

The printing system 115 comprises a multi-core controller processor 170. As shown in FIG. 1A, the processor 170 comprises four processor cores 171, 172, 173 and 174, for executing one or more software code modules forming a client print manager module 181 which is stored in a memory 190.

The printing system 115 also comprises a printer engine 195 coupled to the processor 170, via an interconnected bus 175. The client print manager 181 renders a PDL page received from the software application 133 to pixel values 196 at device resolution. The pixel values 196 may then be printed to paper by the printer engine 195, for example. The client print manager module 181 will be described in detail below with reference to FIG. 2.

Figure 1B:
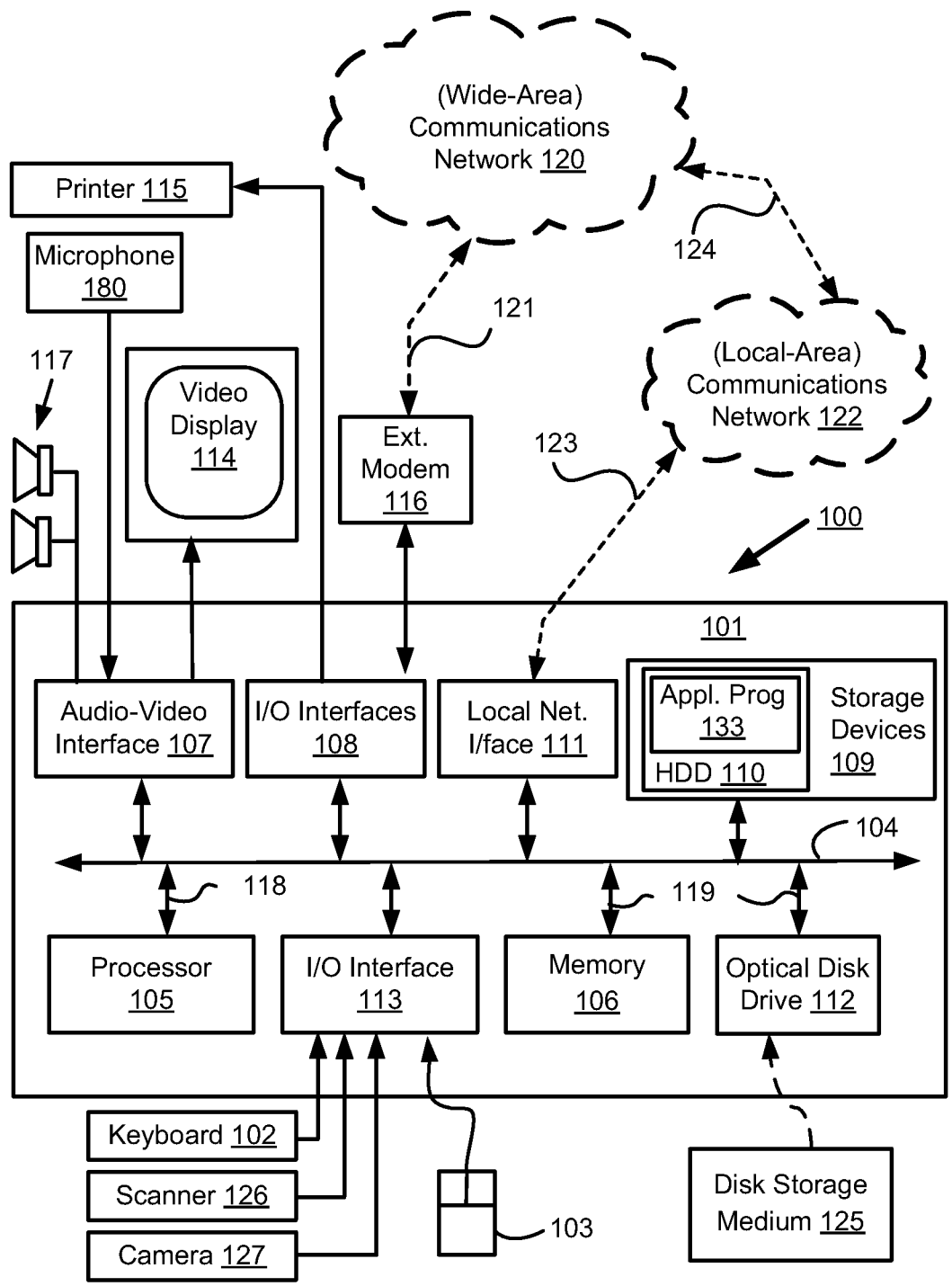
FIGS. 1B and 1C form a schematic block diagram of a general purpose computer of FIG. 1A in more detail.

As seen in more detail in FIG. 1B, the pixel rendering system 100 includes: the computer module 101; input devices such as a keyboard 102, a mouse pointer device 103, a scanner 126, a camera 127, and a microphone 180; and output devices including the printing system 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes the at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and the printing system 115. In some implementations, the modem 116 may be incorporated within the computer module 101, for example within the interface 108. The computer module 101 also has a local network interface 111, which permits coupling of the computer module 101 via a connection 123 to a local-area communications network 122, known as a Local Area Network (LAN). As illustrated in FIG. 1B, the local communications network 122 may also couple to the wide network 120 via a connection 124, which would typically include a so-called "firewall" device or device of similar functionality. The local network interface 111 may comprise an Ethernet circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practiced include IBM-PC's and compatibles, Sun Sparcstations, Apple Mac™ or alike computer systems.

Methods described below may be implemented using the system 100 wherein one or more steps of the processes of FIGS. 2 to 14, to be described, may be implemented as one or more code modules of the software application program 133 executable within the system 100. One or more of the steps of the described methods may be effected by instructions 131 (see FIG. 1C) in the software 133 that are carried out within the system 100.

As also described below, one or more steps of the processes of FIGS. 2 to 14, to be described, may be implemented as one or more of the code modules forming the client print manager module 181 executable within the printing system 115. Again, one or more of the steps of the described methods may be effected by instructions, similar to the instructions 131 in the software 133.

The software instructions 131 implementing the software 133 may be formed as the one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application program 133 and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 1C:
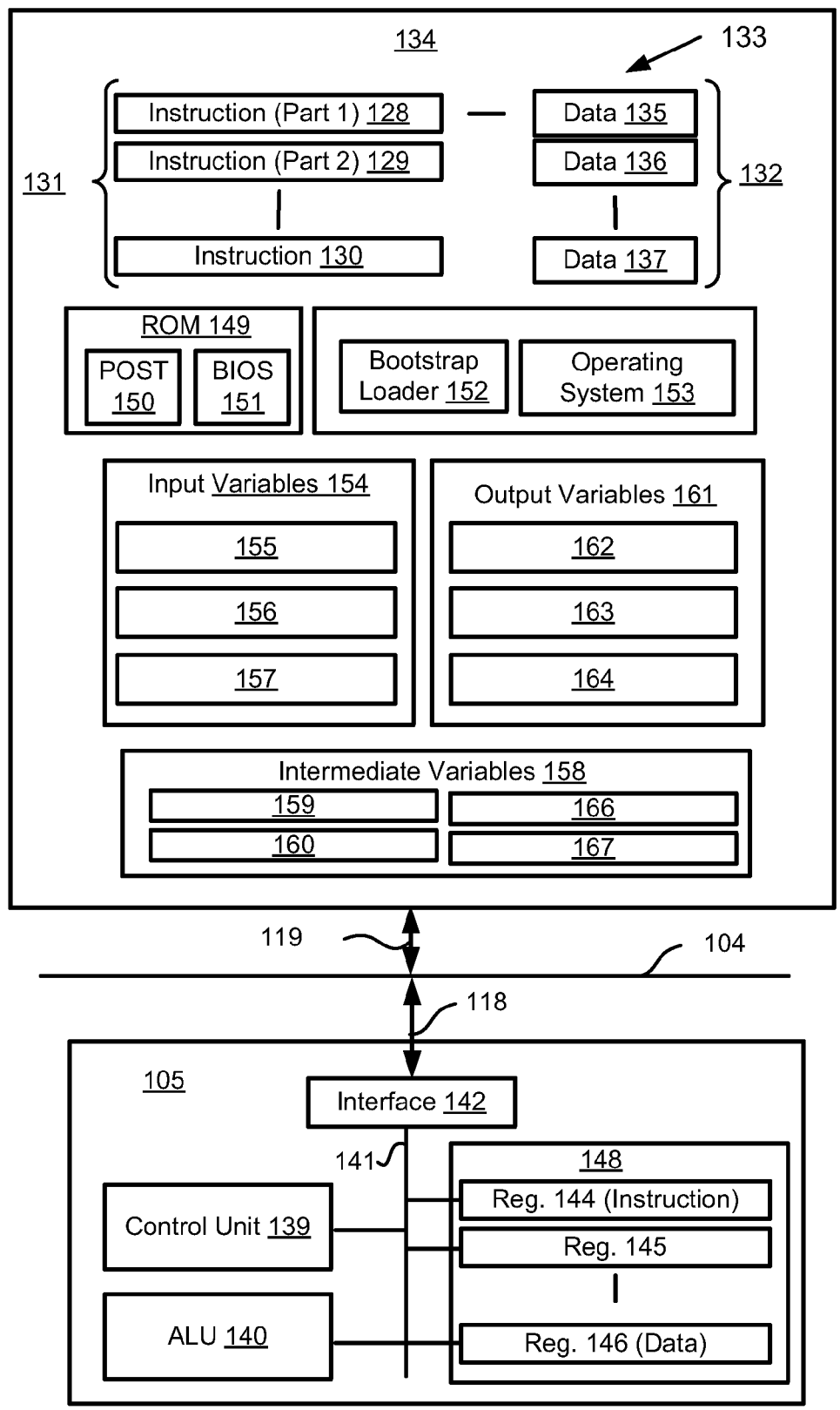

FIG. 1C is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1B.

When the computer module 101 is initially powered up, a power-on self-test (POST) program 150 executes. The POST program 150 is typically stored in a ROM 149 of the semiconductor memory 106 of FIG. 1B. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1B. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfill various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1B need to be used properly so that each process can run effectively. Accordingly, the aggregated memory 134 is not intended to illustrate how particular segments of memory are allocated (unless otherwise stated), but rather to provide a general view of the memory accessible by the system 100 and how such is used.

As shown in FIG. 1C, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1B. The execution of a set of the instructions may in some cases result in output of data. Execution may also involve storing data or variables to the memory 134.

The methods described below may use input variables 154, which are stored in the memory 134 in corresponding memory locations 155, 156, 157. The disclosed methods produce output variables 161, which are stored in the memory 134 in corresponding memory locations 162, 163, 164. Intermediate variables 158 may be stored in memory locations 159, 160, 166 and 167.

Referring to the processor 105 of FIG. 1C, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

One or more steps or sub-processes in the processes of FIGS. 2 to 14 may be associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

As described above, one or more steps of the processes of FIGS. 2 to 14, to be described, may be implemented as one or more code modules of the client print manager module 181 executable within the printing system 115. The code modules forming the client print manager module 181 are typically stored in the memory 190. The code modules forming the client print manager module 181 may be loaded into the printing system 115 from the computer readable medium, and then executed by the printing system 115. A computer readable medium having such software or computer program recorded on the computer readable medium is a computer program product. The use of the computer program product in the printing system 115 preferably effects an advantageous apparatus for implementing one or more steps of the described methods.

In some instances, the client print manager module 181 may be supplied to the user encoded on one or more CD-ROMs, similar to the CD-ROMs 125, or alternatively may be read by the user from the networks 120 or 122. Still further, software code modules for the client print manager module 181 may also be loaded into the system 100 from other computer readable media.

The code modules implementing the client print manager module 181 may be executed by the processor 170 in a similar manner to the code modules implementing the software application program 133 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

FIG. 2 is a schematic block diagram showing the client print manager module 181 in more detail. The client print manager module 181 may be implemented as software code modules in the form of a PDL interpreter module 202, an object processor module 203, a text processor module 208, a vector processor module 207, a bitmap processor module 205 and a raster image processor (RIP) module 206. The software code modules 202, 203, 208, 207, 205 and 206 are resident in the memory 190 and controlled in their execution by the processor 170.

The client print manager module 140 will be described by way of example with reference to the PDL data representing the printable page 251 provided to the printing system 115 for printing to a print medium.

The PDL data representing the printable page 251 (e.g., a PDL representation of a bitmap representing the page 251 to be rendered), consisting of PDL rendering commands is stored in a PDL data buffer 201 configured in the memory 190. The PDL data for the printable page 251 is streamed as one or more bit-streams 220 into the PDL interpreter module 202 which reads and interprets the PDL data and creates graphic objects 221 suitable for rendering. A graphic object may either be a text object, a vector object or an image object. The graphic objects 221 are then processed by the object processor module 203 which stores the graphic objects in appropriate data stores in memory 190. The object processor module 203 then passes image objects 222 to the bitmap processor module 205, vector objects 223 to the vector processor module 207 and text objects 224 to the text processor module 208. The bitmap processor module 205 compresses the image objects 222 and uses a compressed bitmap data buffer 204 configured within the memory 190 to store the compressed image objects. The bitmap processor module 205 also generates compressed scaling factors for the image objects according to the disclosed scaling sequence encoding (SSE) arrangement. The bitmap processor module 205 will be described in detail below with reference to FIG. 3. The vector processor module 207 generates an efficient encoding of the vector objects 223 according to the disclosed scan-based edge approximation (SBEA) and scan-based edge encoding (SBEE) arrangements, which will be described in detail below with reference to FIGS. 10 and 11. The text processor module 208 generates a raster representation of text characters that form the text objects 224, according to any suitable method.

The object processor module 203 also forms a display list representation that references the graphic objects 221. The display list may be stored within the memory 190. The display list contains a sequence of references to graphic objects with consecutive z-order, sorted by the first scan-lines on which the graphic objects appear. The display list and the graphic objects referenced by the display list are streamed, as one or more bit-streams 225-227, to the raster image processor (RIP) module 206. The image object bit-stream 225 contains image scale encodings encoded using the disclosed SSE arrangement and decompressed source images, as described in more detail below with reference to FIG. 3. The vector object bit-stream 226 contains vector objects encoded using the disclosed SBEA and SBEE arrangements, as described in more detail below with reference to FIGS. 10 and 11. The text object bit-stream 227 contains rasterised text characters.

The RIP module 206 generates pixels (e.g., 196) from the received bit-streams 225-227 and the pixels 196 may then be output to the printer engine 195 for the printing. The RIP module 206 also decodes the encoded vector objects in the vector object bit-stream 226 and the encoded scaling factors in the image object bit-stream 225. The decoding of the bit-streams 225 and 226 is described in detail below with reference to FIGS. 8 and 12.

The disclosed arrangements of encoding vector objects and image objects utilise a continued fractions representation of some value. For encoding vector objects, the SBEA and SBEE arrangements described here use continued fractions to approximate the sequence of offset values of an edge of vectors in a small amount of memory. For encoding image objects, the SSE arrangement described here uses continued fractions to approximate the scaling factors in the x and y directions, which speeds up the mapping of source image pixels to destination image pixels. The approximation of the scaling factors is made to a required level of precision (or precision level). The precision may be determined by a user set value, or by the scaling factors of the source image in the x-direction or y-direction. A general continued fraction representation of a real number X may be determined in accordance with Equation (1), below:

$$X = e_0 + \cfrac{1}{e_1 + \cfrac{1}{e_2 + \cfrac{1}{e_3 + a?|}}} \quad (1)$$

where $e_0$, $e_1$, $e_2$, $e_3$, $a?|$ are integers. The continued fraction may be represented as a sequence of coefficients e in accordance with Equation (2), as follows:

$$e = [e_0, e_1, e_2, e_3, a?|] \quad (2)$$

For irrational numbers X, the continued fraction sequence determined in accordance with Equation (2) is infinite. For rational numbers, the sequence determined in accordance with Equation (2) is finite. A given continued fraction sequence may represent an approximation of a given real number. The term $e_0$ in the sequence above is called the integer part of the continued fraction, while the $e_1$, $e_2$, $e_3$, $a?|$ terms in the sequence above are called continued fraction coefficients. The SSE arrangement, described below, calculates the canonical form of continued fraction where all coefficients are positive non-zero integers. The SBEE and SBEA arrangements, described below, calculate the non-canonical form of continued fraction where all coefficients are positive or negative integers of absolute value greater or equal to two (2).

The continued fraction expansion results in a sequence of rational approximations to the number X. Each rational approximation also corresponds to a periodic sequence of integers, as will be described in detail below by way of example.

Figure 3:
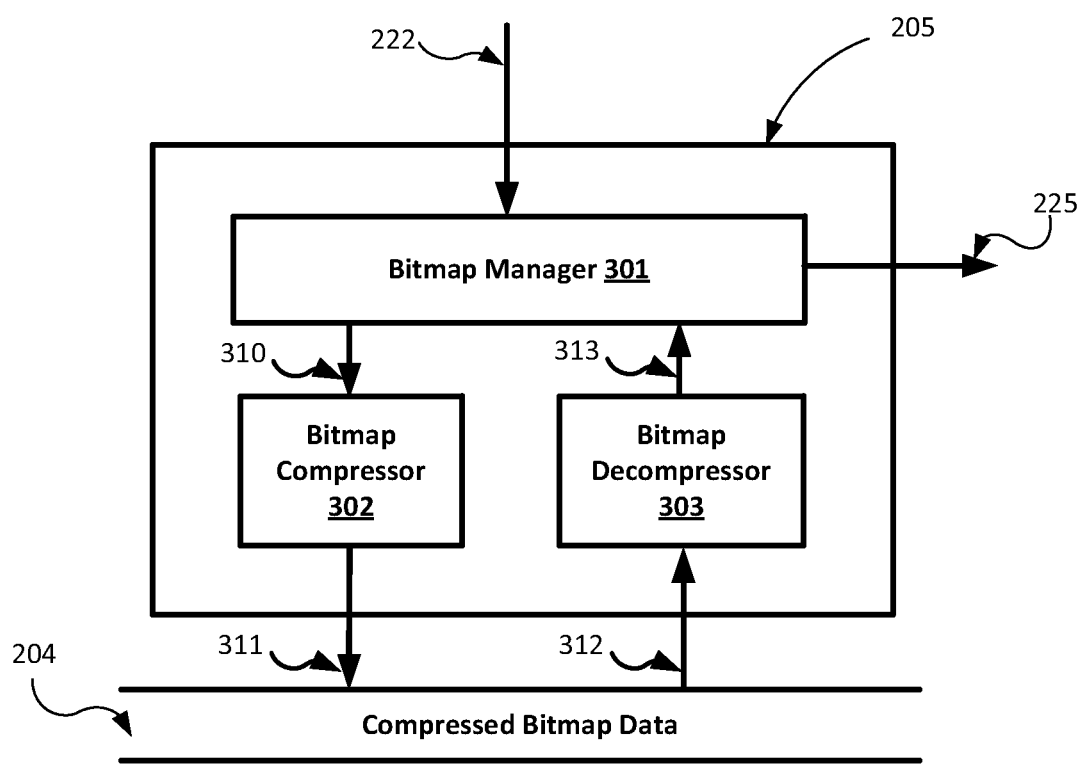
FIG. 3 is a schematic block diagram of a bitmap processor module.

FIG. 3 is a schematic block diagram showing the bitmap processor module 205 in more detail. The bitmap processor module 205 may be implemented as software code modules in the form of a bitmap manager module 301, a bitmap compressor module 302 and a bitmap decompressor module 303. The software code modules 301, 302 and 303 are resident in the memory 190 and are controlled in their execution by the processor 170.

Each image object 222 received by the bitmap processor module 205 contains a source image and an image transform. A source image contains the pixel values of the image object 222, within a pixel grid in a source image resolution. The source image may also contain a source colour space, which defines how each pixel value is to be interpreted when the source image is rendered by the RIP module 206. The image transform specifies the mapping from pixels in the source image to pixels in the destination image for the page 251. The image transform is described below.

The bitmap manager module passes the source image 310 of an image object 222 to the bitmap compressor module 302. The bitmap compressor module 302 compresses the source image 310 using any suitable one of many image compression techniques known to those in the relevant art. One such technique is the JPEG image compression format. The bitmap compressor module 302 stores the compressed source image 311 in the compressed bitmap data store 204.

The image transform of an image object, Ic, describes where on the page (e.g., 251) the image is situated (translation), along with any scaling, rotation or skew that is to be applied to the source image. For example, the image transform that describes image scaling and translation is defined as Equation 3, below:

$$Ic = \begin{bmatrix} S_x & 0 & 0 \\ 0 & S_y & 0 \\ T_x & T_y & 1 \end{bmatrix} \quad (3)$$

where $S_x$ and $S_y$ are the scaling factors for the image in the x and y directions, respectively, and $T_x$ and $T_y$ are the translation values for the image in the x and y directions, respectively. As described previously, for each pixel in the destination image, the image transform is used to locate the pixels in the source image that contribute to a pixel in the destination image.

Locating the pixels in the source image that contribute to a pixel in the destination image may be performed using Bresenham's algorithm and stored sequences of pixel mappings. However, such methods are either slow or require a large amount of memory. In the disclosed SSE arrangement, the bitmap manager module 301 efficiently encodes the image transform using a small amount of memory, so that the mapping from pixels in the destination image to pixels in the source image can be performed quickly. In particular, the bitmap manager module 301 efficiently encodes the scaling factors $S_x$ and $S_y$. The encoding of the scaling factors $S_x$ and $S_y$ will be described in detail below, with reference to FIG. 4. The bitmap manager module 301 stores the encoded image transform in memory 190.

When the RIP module 206 needs to produce pixels for the page 251 to be printed, the bitmap decompressor module 303 is used to decompress the compressed source image for the page 251. The compressed source image 312 is retrieved from the compressed bitmap data store 204, and decompressed using any suitable one of many image decompression techniques known to those in the relevant art. The decompressed source image 313 is passed to the bitmap manager module 301, which creates an image object bitstream 225 consisting of the encoded scaling factors and decompressed source image 313.

As described previously, the disclosed SSE arrangement is used to encode the scaling factors of an image to be rendered. The mapping from source image pixels to destination image pixels will now be described.

Figure 5:
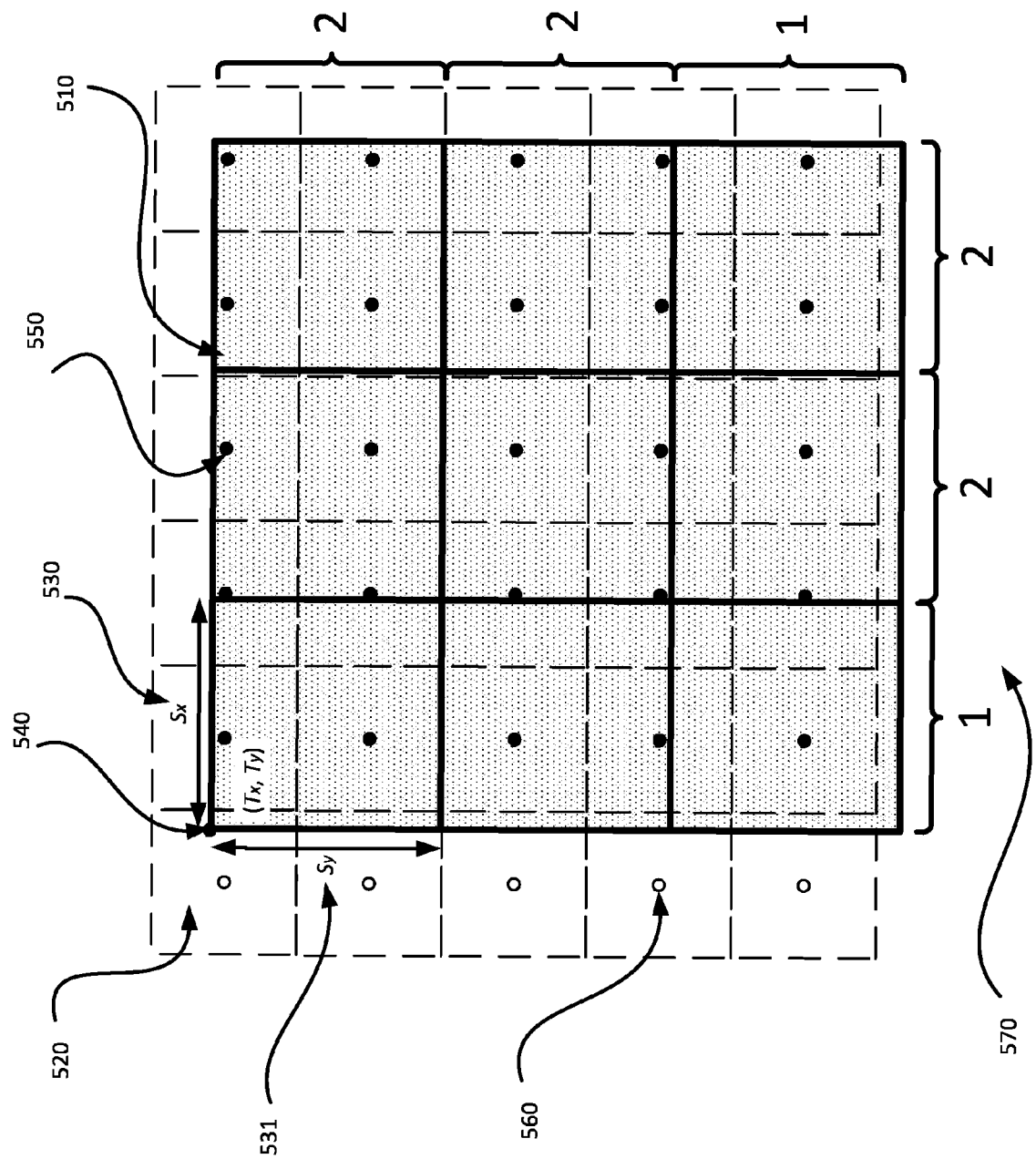
FIG. 5 shows an example image with a scaling factor, size and location on a page.

FIG. 5 shows the mapping between source image pixels 510 of a source image (shown shaded with thick solid lines separating pixels) and destination image pixels 520 of the destination image for the page 251 (shown unshaded with dashed lines separating pixels). Each source image pixel 510 covers some area of the destination image on the page 251, as determined by the scaling factors $S_x$ 530 and $S_y$ 531, and the origin of the source image 540 is placed at the location ($T_x$, $T_y$) on the page 251. Each destination image pixel 520 contains a sample point, such that if the sample point is within the area covered by a source image pixel then the destination image pixel is active. For example, the pixel with sample point 550 is active. Otherwise, the destination image pixel is inactive. For example, the pixel with sample point 560 is inactive.

In the example shown in FIG. 5, the image transform matrix Ic is as follows:

$$Ic = \begin{bmatrix} 1.5833a?| & 0 & 0 \\ 0 & 1.5833?a| & 0 \\ 0.87 & 0.4 & 1 \end{bmatrix}$$

The image transform matrix Ic represents a source image of three (3) by three (3) source pixels with an origin 540 of the source image being at ($T_x$, $T_y$), where ($T_x$=0.87, $T_y$=0.4). The example source image has a scaling factor of 1.5833a?| in each of the horizontal and vertical directions. The transformation of the source image may also be represented as a pixel mapping 570 that specifies the number of active destination pixels 550 that are sampled by a given source pixel 510, as seen in FIG. 5.

The continued fraction representation of the scaling factor, 1.5833a?|, is as follows:

$$1 + \cfrac{1}{1 + \cfrac{1}{1 + \cfrac{1}{2 + \cfrac{1}{2}}}}$$

and the corresponding sequence of coefficients e is [1, 1, 1, 2, 2].

The encoding of an image transform using the disclosed SSE arrangement will now be described with reference to FIG. 4.

Figure 4:
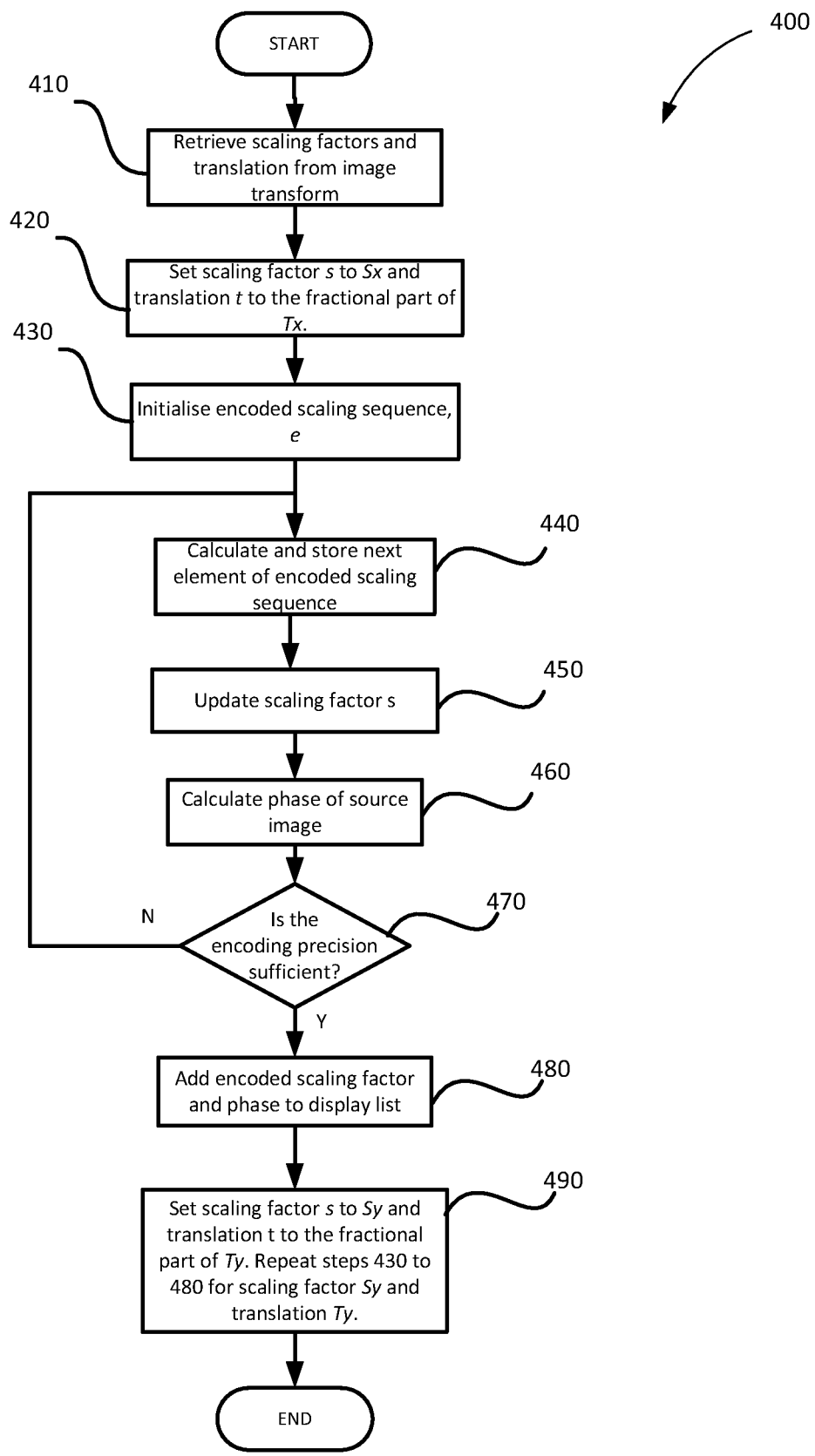
FIG. 4 is a flow diagram showing a method of encoding the scaling factor of an image with a given scaling factor, size, and location on a page according to the disclosed SSE arrangement.

FIG. 4 shows a method 400 of encoding an image transform for an image to be rendered. In encoding the image transform, the method 400 encodes scaling factors $S_x$ and $S_y$. The method 400 may be implemented as one or more of the software code modules forming the bitmap manager module 301 resident within the memory 190 and being controlled in their execution by the processor 170.

The method 400 begins at retrieving step 410, where the bitmap manager module 301, under execution of the processor 170, retrieves the scaling factors $S_x$ and $S_y$ and the translation values $T_x$ and $T_y$ from the image transform for the image. The scaling factors $S_x$ and $S_y$ and the translation values $T_x$ and $T_y$ may be retrieved from the memory 190.

At storing step 420, the scaling factor $S_x$ is stored by the bitmap manager module 301 in variable s configured within memory 190, and the fractional part of the translation in x direction, $T_x$, is stored in a variable t configured within memory 190.

Then at determining step 430, the bitmap manager module 301, under execution of the processor 170, is used for determining a sequence of pixel mapping values representing the scaling factor $S_x$ stored in variable s. The sequence of pixel mapping values is in the form of an encoded scaling sequence, e. The pixel mapping values may be encoded in a PDL rendering command. At step 430, the encoded scaling sequence, e, is set to be an empty sequence configured within the memory 190. The sequence, e, is used in the method 400 to store the sequence of pixel mapping values in the form of continued fractions coefficients representing an approximate pixel mapping from destination image pixels to source image pixels. The encoded scaling sequence e forms a continued fractions approximation of the scaling factor $S_x$ stored in variable s.

The remaining steps 440 to 470 of the method 400 are used for modifying at least one pixel mapping value in the sequence e of pixel mapping values to obtain a modified sequence of pixel mapping values in the form of continued fractions coefficients. As described below, the pixel mapping values in the sequence e are modified depending on a precision level. The precision may be determined by a user set value, or by the scaling factors of the source image in the x- or y-direction. In particular, at steps 440 to 470, new continued fractions coefficients of the encoded scaling sequence e that approximate the scaling factor more closely, are iteratively calculated.

The method 400 then proceeds to encoding step 440. At the encoding step 440, the bitmap manager module 301, under execution of the processor 170, calculates the next coefficient $e_n$ of encoded scaling sequence and appends the next coefficient $e_n$ to the encoded scaling sequence e configured within the memory 190. The next coefficient $e_n$ is the next element of the continued fraction expansion and is calculated by taking the floor of the scaling factor stored in variable s in accordance with Equation 4, as follows:

$$e_n := asa \quad (4)$$

At updating step 450, the variable s configured within the memory 190 is updated by the bitmap manager module 301 to represent the part of the scaling factor that is yet to be encoded. The variable s is updated according to Equation 5, as follows:

$$s := \frac{1}{s - e_n} \quad (5)$$

Then at phase calculation step 460, the bitmap manager module 301, under execution of the processor 170, calculates the phase $\phi_n$ of the source image in the encoded scaling sequence e. At step 460, a period $p_n$ of the new encoded scaling sequence is calculated from the new encoded coefficient $e_n$. The phase $\phi_n$ is then calculated at step 460 using the fractional translation value t and the period $p_n$. The phase $\phi_n$ of the source image in the encoded scaling sequence e may be calculated at step 460 in accordance with Equations 6 and 7, as follows:

$$p_n := \begin{cases} 1, & \text{when } n = 0, 1 \\ e_n \times p_{n-1} + p_{n-2}, & \text{when} > 1 \end{cases} \quad (6)$$

$$\varphi_n := \begin{cases} 1, & \text{when } n = 0 \\ (-\lfloor t \times p_n + 1 \rfloor \times p_{n-1}) \bmod p_n, & \text{when } n \text{ is even} \\ (\lfloor t \times p_n + 1 \rfloor \times p_{n-1} - 1) \bmod p_n, & \text{when } n \text{ is odd} \end{cases} \quad (7)$$

The phase $\phi_n$ specifies which element in the pixel mapping sequence $m_n$ represents the first source pixel in the image.

The method 400 then proceeds to the decision step 470, where the bitmap manager module 301 determines if the period $p_n$ and phase $\phi_n$ are of sufficient precision to accurately encode the image scaling factor (i.e., either $S_x$ or $S_y$). In determining if the period $p_n$ and phase $\phi_n$ are of sufficient precision at step 470, the bitmap manager module 301 determines a precision level at which the modified encoded scaling sequence e is to be encoded to represent the scaling factor (i.e., either $S_x$ or $S_y$). The precision may be determined by a user set value, or by the scaling factors of the source image in the x- or y-direction. The precision level applied to the period $p_n$ and phase $\phi_n$ determines size of a portion of differential offset values repeated in the sequence e (or sequence of pixel mapping values encoded in the rendering command) with a higher precision level resulting in a smaller portion of differential offset values. A first condition in the decision step 470 is that the period $p_n$ is greater than the width in pixels of the source image. The first condition ensures that the final pixel mapping from source pixels to destination pixels does not cover multiple periods of the pixel mapping sequence $m_n$.

A second condition in the decision step 470 is that the pixel mappings produced by starting the sequence $m_n$ at the phase $\phi_n$ is equal to the pixel mappings produced by starting the sequence $m_{n-1}$ at the phase $\phi_{n-1}$. Once the second condition is met the pixel mapping has converged and is of sufficient degree to encode the image scaling factor. A method 800 of decoding a scaling sequence to generate the pixel mapping sequence $m_n$, as executed at step 470, will be described in detail below with reference to FIG. 8.

An alternative condition for the decision step 470 is to determine if the coefficient $e_n$ or period $p_n$ exceed some threshold value. Large values of $e_n$ or $p_n$ indicate that the continued fraction approximation is very close to the required precision.

If the period $p_n$ and phase $\phi_n$ are of sufficient precision, then the method 400 proceeds to storing step 480. At storing step 480, the encoded scaling sequence e is stored in the display list configured within the memory 190, by the bitmap manager module 301. At step 480, the precision of the approximation of the scaling factor s is close enough for the purposes of rendering the image object in the given direction (i.e., x or y).

The method 400 then proceeds to step 490, where the scaling factor $S_y$ is stored by the bitmap manager module 301 in variables configured within the memory 190, and the fractional part of the translation in the y direction, $T_y$, is stored in a variable t configured within the memory 190.

Steps 430 to 480 are then repeated, so that the scaling factor in the y direction can be encoded and stored in accordance with the SSE arrangement. If the scaling factor in the x and y directions are the same, step 490 may be skipped, and the encoded scaling sequence that was calculated for the x direction may be reused for the scaling factor in the y direction. The method 400 terminates upon completion of step 490.

If, at step 470, the bitmap manager module 301, under execution of the processor 170 determines that the period and phase are not of sufficient precision then the method 400 returns to step 440 in which the next encoded coefficient $e_{n+1}$ is calculated from the remainder of the scaling factor s. In this case, more precision is required to adequately encode the scaling factor.

A method of determining the precision used at decision step 470 will now be described. If the pixel mapping sequence length exceeds the width of the source image, then a calculation regarding the phase of the sequence is executed. Also, if the pixel mapping sequence length exceeds the width of the source image, then a scanline of source image pixels fits within one period of the pixel mapping sequence. However, small differences in sub-pixel starting position of data may have an effect on phase of the pixel mapping sequence. From the position of the sub-pixel origin t of the data, two candidate phase regions for the pixel mapping sequence may be identified by the processor 105, where a phase region may be defined as sub-pixel interval. The first phase region is the region in which the position of the sub-pixel origin t is located. The second phase region is the region immediately adjacent to the first phase region. So, the boundary between the two adjacent phase regions (i.e., the first phase region and the second phase region) is some multiple of $$\frac{1}{Lp_n}.$$

The boundary between the two adjacent phase regions may be designated as B. A next iteration of the encoded sequence is $e_{n+1}$. The new length of the pixel mapping sequence is now $LP_{n+1} = Lp_n e_{n+1} + Lp_{n-1}$. The phase regions, which includes both B and t, may be determined by the processor 105. If the boundary B and the position of the sub-pixel origin t are the same region, then the encoding of the sequence needs to be reiterated and the method 400 returns from step 470 to step 440. Otherwise, if B and t are not in the same phase region, then encoding of the sequence is terminated and the method 400 proceeds to step 480.

As described above, if the boundary B is overlapping the phase region created according to a new iteration and the second phase region is overlapping another region adjacent to the phase region of the new iteration of the second pixel mapping, then the precision is sufficient to encode the pixel mapping sequence. Accordingly, the process of encoding the pixel mapping sequence in steps 440 to 460 may thus be terminated. Otherwise, the method 400 returns to step 440 from step 470 and the encoding process of steps 440 to 470 is reiterated.

Figure 8:
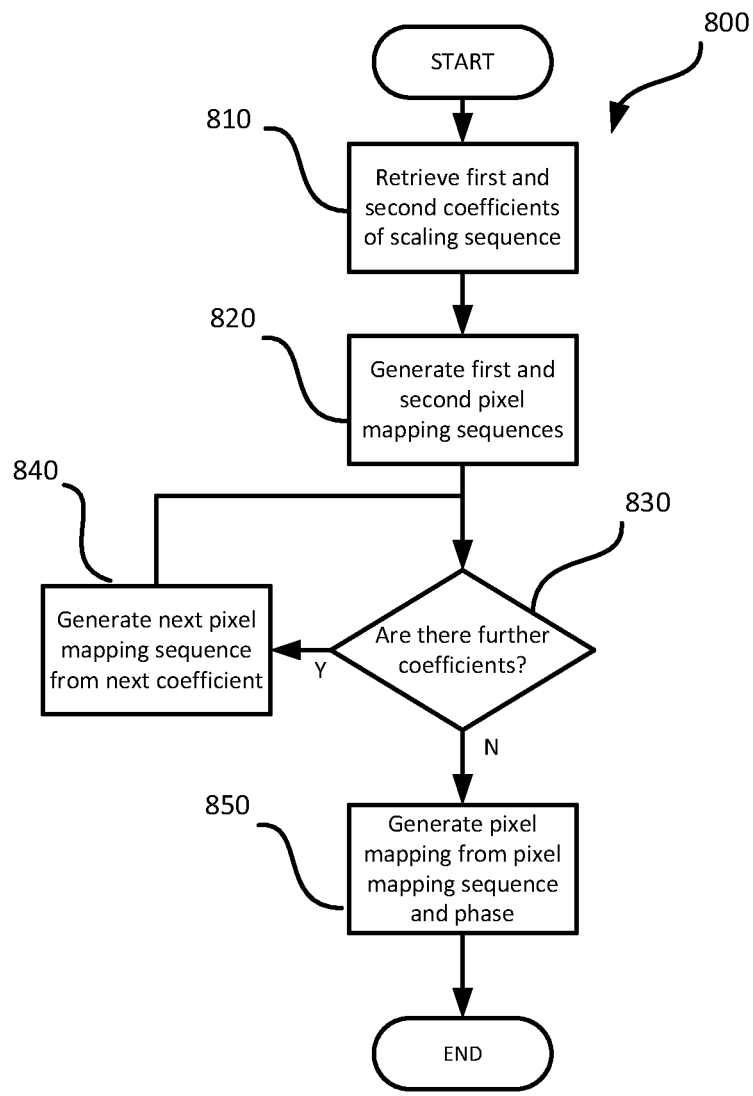
FIG. 8 is a flow diagram showing a method of decoding a scaling sequence encoded in accordance with the SSE arrangement into a pixel mapping.

The method 800 of decoding the encoded scaling sequence into a pixel mapping sequence $m_n$, as executed at step 470, will now be described with reference to FIG. 8. The method 800 is executed at render time in the raster image processing module 206. The method 800 may be implemented as one or more of the software code modules forming the raster image processing module 206 resident within the memory 190 and being controlled in their execution by the processor 170.

The method 800 begins at retrieving step 810, where the first and second coefficients $e_0$ and $e_1$ of the encoded scaling sequence are retrieved from the display list, configured within the memory 190, by the raster image processing module 206.

Then at step 820, the first and second pixel mapping sequences $m_0$ and $m_1$ are generated by the raster image processing module 206 from the coefficients $e_0$ and $e_1$. The first pixel mapping sequence $m_0$ is one instance of the number $e_0$, and the second sequence $m_1$ consists of the number $e_0$ repeated for $e_1-1$ instances, followed by one instance of the number $e_0+1$.

At decision step 830, if the raster image processing module 206 determines that there are any coefficients in the encoded scaling sequence that are yet to be processed, then the method 800 proceeds to step 840. Otherwise, the method 800 proceeds to step proceeds to step 850.

At generating step 840, the raster image processing module 206 generates the next sequence $m_n$, by repeating $e_n$ instances of the sequence $m_{n-1}$ followed by one instance of the sequence $m_{n-2}$. After generating the sequence $m_n$, the method 800 proceeds again to step 830.

If the raster image processing module 206 determines that there are no more coefficients to process in the encoded scaling sequence, then the method 800 proceeds to step 850.

At step 850, the raster image processing module 206 generates a pixel mapping from the elements of the pixel mapping sequence $m_n$, starting at the phase $\phi$. The elements of the pixel mapping sequence $m_n$ represent the number of destination pixels that sample a given image source pixel.

The methods described above will now be further described by way of example with reference to FIG. 5. The image transform for this example, including scaling factors and translation, was described previously. In particular, $S_x$ and $S_y$ are equal to 1.5833, $T_x$ is equal to 0.87, and $T_y$ is equal to 0.4.

The software code modules forming the bitmap manager module 301 execute the steps of the method 400 as described above with reference to FIG. 4. In accordance with the present example, as at step 410, the scaling factors and translation are retrieved from the image transform Ic. In this example, $S_x$ and $S_y$ are equal to 1.5833, $T_x$ is equal to 0.87, and $T_y$ is equal to 0.4. The encoded scaling sequence for the scaling factor in the x direction is calculated. Therefore, at step 420, s is set to 1.5833 and t is set to 0.87. The encoded scaling sequence is initialised, as at step 430. For the first iteration of the method 400, the calculations at step 440 and step 450 result in the following values:

$$e_0 := asa = 1$$

$$s := \frac{1}{s-e_0} = \frac{1}{1.5833-1} = 1.7142a?|$$

Next, as at step 460, the first period $p_0$ and phase $\phi_0$ are calculated resulting in the following values:

$$p_0 := 1$$

$$\phi_0 := 0$$

In accordance with the present example, as at the decision step 470, the period $p_0$ and phase $\phi_0$ are found to not be of sufficient precision to encode the image, as the period $p_0$ is less than the width of the three (3) by three (3) pixel source image.

The method 400 thus proceeds to the next iteration of steps 440 and 450, where the next coefficient $e_1$ of the encoded scaling sequence and the new value of s is calculated resulting in the following values:

$$e_1 := \lfloor s \rfloor = 1$$

$$s := \frac{1}{s-e_1} = \frac{1}{1.7412-1} = 1.4$$

Next, as at step 460, the second period $p_1$ and phase $\phi_1$ are calculated resulting in the following values:

$$p_1 := 1$$

$$\phi_1 := 0$$

As at the decision step 470, the period $p_1$ and phase $\phi_1$ are again found to not be of sufficient precision to encode the image, as the period $p_1$ is less than the width of the source image.

The method 400 then proceeds to the third iteration of steps 440 and 450 where the third coefficient $e_2$ of the scaling sequence and the new value of s is calculated as follows:

$$e_2 := \lfloor s \rfloor = 1$$

$$s := \frac{1}{s-e_1} = \frac{1}{1.3981-1} = 2.512\ldots$$

Next, as at step 460, the period $p_2$ and phase $\phi$ are calculated as follows:

$$p_2 := e_2 \times p_1 + p_0 = 1 \times 1 + 1 = 2$$

$$\phi_n := -\lfloor t \times p_2 + 1 \rfloor \times p_1 \bmod p_2 = -\lfloor 0.87 \times 2 + 1 \rfloor \times 1 \bmod 2 = 0$$

Once again the period $p_2$ is less than the width of the source image and therefore not of sufficient precision to encode the scaling factor.

In accordance with the present example, subsequent iterations of the method 400 produce the results in Table 1, below. The column $m_n$ of Table 1 illustrates the periodic pixel mapping sequence that would be generated by the decoding method 800 of FIG. 8 from the encoded coefficients $e_0$ to $e_n$.

TABLE 1

| N | s | $e_n$ | $p_n$ | $\phi$ | $m_n$ | Pixel Mapping |
|---|---|---|---|---|---|---|
| 0 | 1.5833... | 1 | 1 | 0 | 1 | 111 |
| 1 | 1.7142... | 1 | 1 | 0 | 2 | 222 |
| 2 | 1.4 | 1 | 2 | 1 | 21 | 121 |
| 3 | 2.5 | 2 | 5 | 3 | 21212 | 122 |
| 4 | 2 | 2 | 12 | 3 | 212122121221 | 122 |

As seen in Table 1, by n=4 the pixel mapping starting at phase $\phi_n$ has converged to the sequence "122", which corresponds to the pixel mapping 570. For the pixel mapping 570, the first source image pixel is sampled by one destination pixel, the second source image pixel is sampled by two destination pixels, and the third source image pixel is sampled by two destination pixels. Thus, the required precision has been reached for the three (3) by (3) source image where t=0.87.

In a separate implementation of the present invention, the sequence encoding as described in the current invention may be used to encode edges of a graphical objects. These edges, which are vectorised to form vector segments that define the boundaries of graphic objects, may be encoded as described below.

A pixel placement rule, stored in memory (not shown) on-board the processor 170 and/or in the memory 190, may be used to determine an integer pixel location, along a given scanline, at which a vector input edge crosses that scanline. Pixel placement rules will be described below in more detail with reference to FIG. 9.

Figure 9:
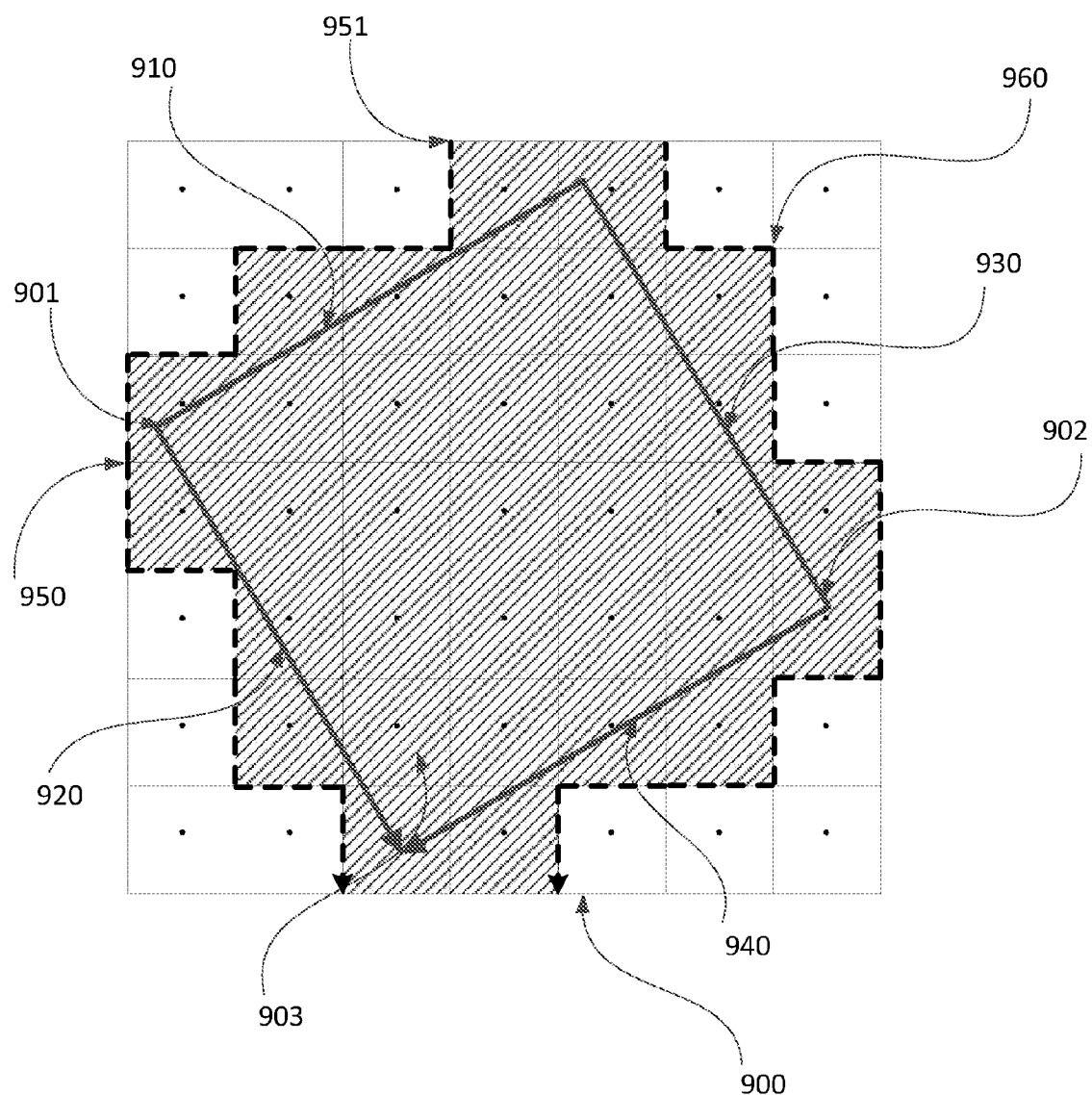
FIG. 9 shows an example of a graphic object and an object outline representation of the graphic object.
Figure 10:
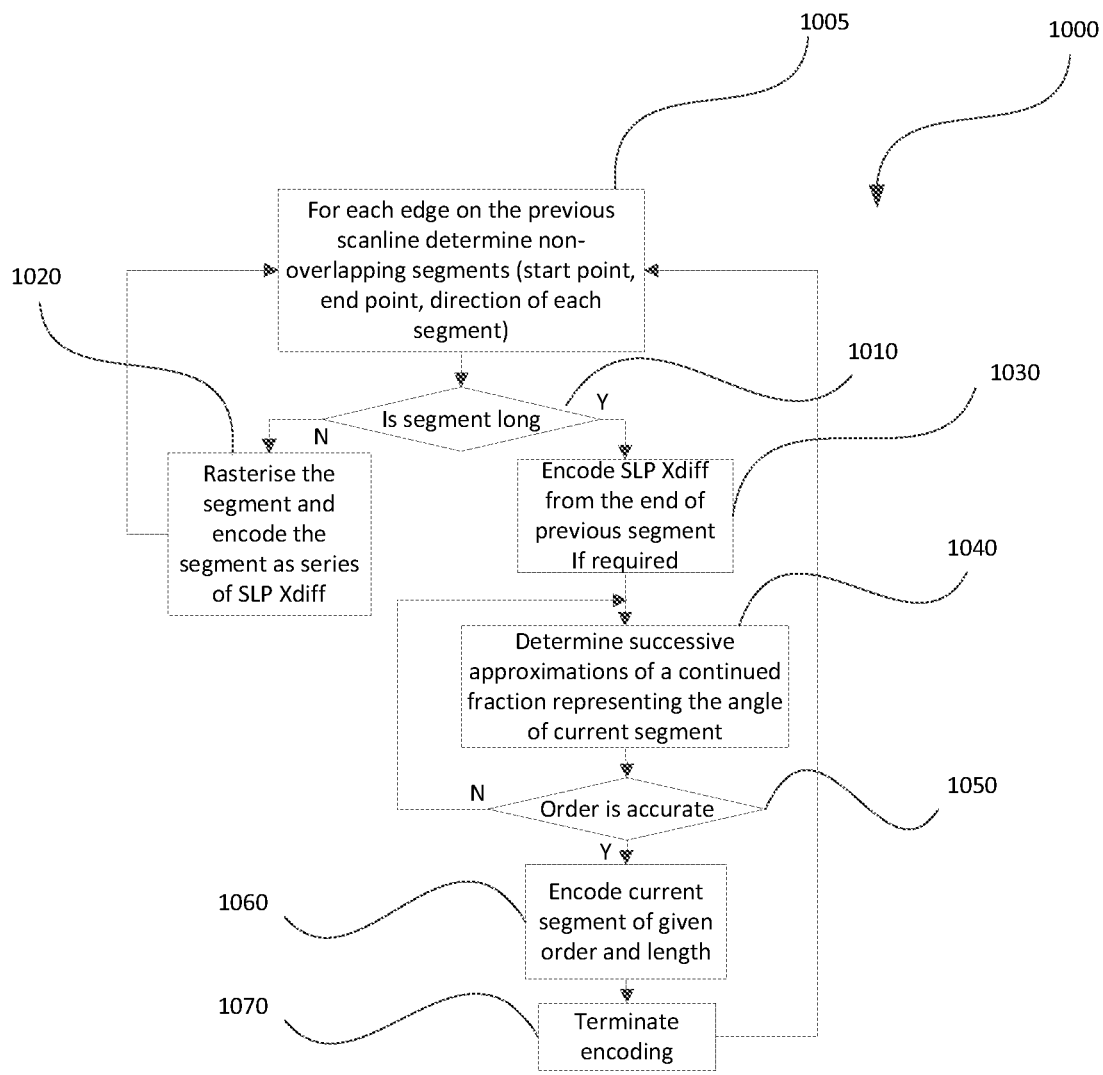
FIG. 10 is a flow diagram showing a method of encoding input vector edges of a graphical object to pixel aligned output edges, according to a scan based edge approximation (SBEA) arrangement.

FIG. 9 shows a set of edges 901 and 902 describing the outline of a graphic object to be rendered onto a pixel grid 900. Edges are further subdivided into segments. The size of the edge segments is depending on the error tolerance at which the edge is to be rendered, as will be explained later. In particular, edge 901 consists of segments 910 and 920, whereas edge 902 consists of segments 930 and 940. When the graphic object of FIG. 9 is scan converted using the PostScript™ pixel placement rule, the pixels lying within hatched region 903 are filled with the fill associated with the object. The PostScript™ pixel placement rule specifies that every pixel that is touched by an edge of the object is considered to be part of the object, and hence should be filled. Other pixel placement rules exist, such as the graphics device interface (GDI) and printer command language (PCL) pixel placement rules. Each set of pixel placement rules can differ from the others in how the pixel placement rules determine which pixels a fill or a stroke should be applied to, given a set of edges which describe the outline of a graphic object. Pixel aligned output edges describing the pixel boundaries of the hatched regions of FIG. 9 are created according to the pixel placement rules described with reference to FIG. 9. A pixel aligned output edge, such as dashed line 950, is the boundary between the region of pixels filled with the fill associated with the object, such as the hatched region 903, and the rest of the pixels.

One method of describing a pixel aligned edge is by scan-based edge offsets. In such a description, coordinates of the starting point of first edge vertical segment in the direction of the scan, such as point 951, are stored as the edge starting point. The edge starting point is followed by an ordered set of offsets between consecutive vertical segments in the direction of the scan. An even number of pixel aligned edges is needed to describe the shape of a rasterised object. In case of a simple object such as the object of FIG. 9, two edges 950 and 960 are needed.

SBEA and SBEE arrangements, described below, may be used to convert a given graphic object, described by a set of edges such as 901 and 902 consisting of segments and by a pixel placement rule such as PostScript™ pixel placement rule, into pixel aligned output edges.

Figure 6:
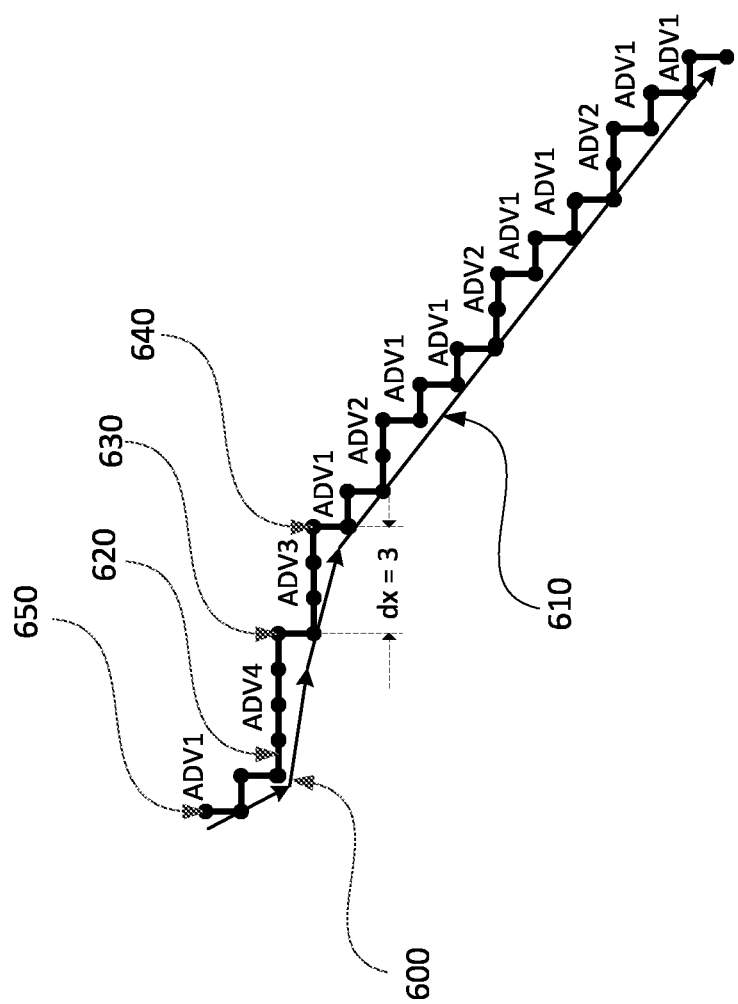
FIG. 6 shows an example of scan converted data encoded with scan-based edge offsets.

FIG. 6 shows an example edge 600, which is composed of several segments. Some of the segments of the edge 600 are short and some of the segments are long. The longest segment of the edge 600 is segment 610. In the example of FIG. 6, edge 600 has been processed into pixel-aligned output edge 620. The output edge starts from point 650 and consists of interleaved vertical and horizontal segments; each segment being one pixel long and running along pixel boundaries.

Scan-based edge offset encoding is shown in FIG. 6 along each of the horizontal segments. The offsets represent the difference between two x coordinates (dx) of two vertical segments between two consecutive scanlines (dy=1). For example, the offset between points 630 and 640 is three (3), because the points 630 and 640 are separated by three (3) horizontal segments apart (dx=3) and x coordinate of point 640 is greater than point 630. The offset of three (3) is shown as ADV3 in FIG. 6. The coordinates of starting point 650 plus the set of offsets represents the encoding of an output edge such as edge 620.

Long input edge segments spanning multiple scanlines, result in a series of output offsets which are nearly identical. For example, edge 610 edge results in a series of offsets ADV1 and ADV2. Other input edges produce offsets varying from ADV0 to ADV4.

Figure 7:
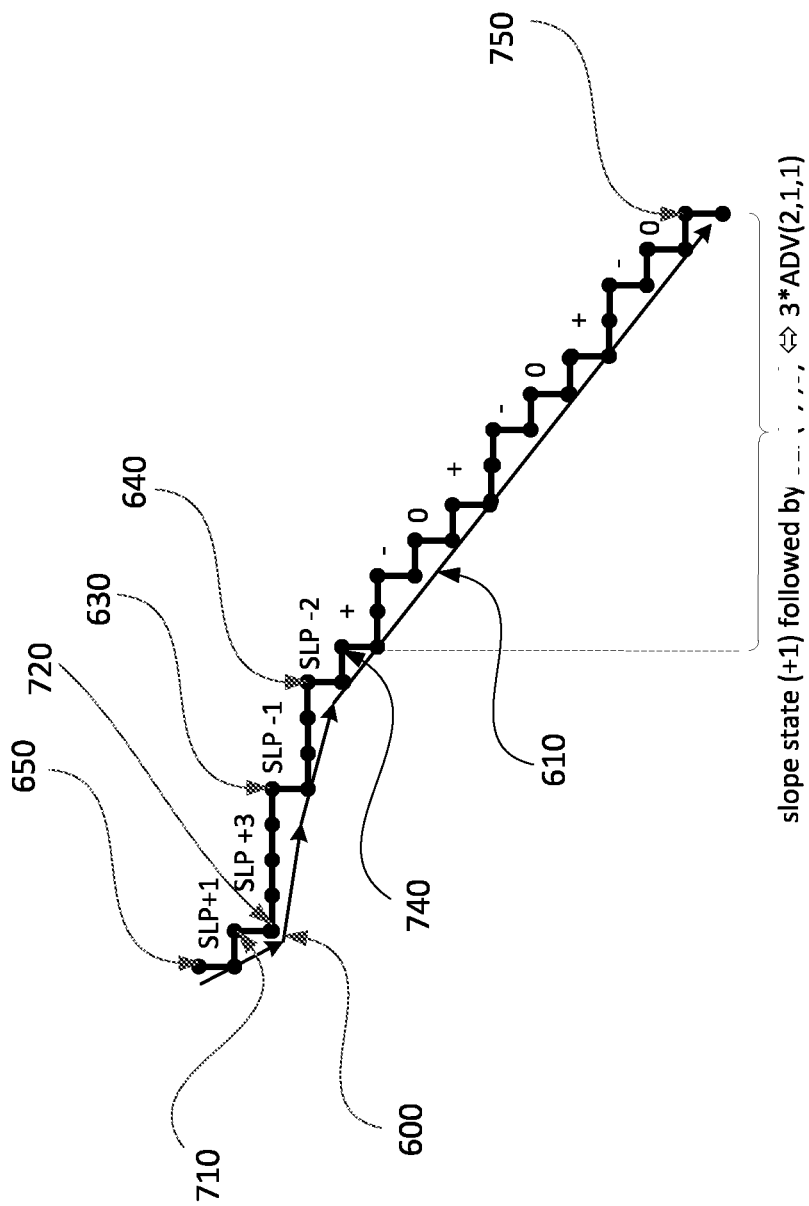
FIG. 7 shows the scan converted data of FIG. 6 encoded with differential offset encoding.

FIG. 7 shows the edges 600 and 620, with the edge 620 encoded with differential offsets. The differential offset of a given point is the difference between the offset of the given point and the offset of a previous point, on the previous scanline. The offset of the starting point is defined as zero (0). For example, the differential offset of point 710 is +1, and marked on FIG. 7 as SLP+1, since the offset of point 710 is one (1) and 650 is the starting point. The point 720, immediately following the point 710 has offset four (4). Therefore, the differential offset of the point 720 is "4-1", which is +3, and marked on FIG. 7 as SLP+3. The next point 640 has differential offset −1, which is the difference between the offset of point 640 of three (3), and the offset of the point 630 of four (4). The differential offset of point 640 is marked on FIG. 7 as SLP−1.

A series of differential offsets of points resulting from conversion of long segments spanning multiple scanlines, consists of mostly values SLP 0, SLP−1 and SLP+1. The values SLP0, SLP−1 and SLP+1 of differential offsets are marked as "0", "−", "+" respectively, for shorter notation. Every first point from the converted segment may have a different value, because of the change of offset from a previous segment. For example, the very first point 740 from converted segment 610 has differential offset SLP−2. However, successive points up to the last point 750, have differential offsets that form a pattern (+, −, 0) repeated three times. The encoding of pixel aligned edges from segment 610 consists of SLP−2, which is the result of the offset from previous point (640), and the pattern (+,−, 0) of differential offsets repeated three times.

The pattern of differential offsets to encode any given edge segment, depends on the angle of the segment (dx/dy) and accuracy of the RIP module 206. The pattern of differential offsets does not depend on the resolution. The three differential segment values in the encoding are grouped into "links". "0" is a major link, pair "+−" is a minor positive link pair, while pair "−+" is a minor negative link pair.

Two types of links may be present in any straight segment encoding: major links and minor positive pairs, or major and minor negative pairs. Minor link pairs are evenly distributed among major links, according to an order property distribution described below.

A pattern of links to approximately encode an edge segment of given angle (dx/dy) may be determined. In particular, from the dx/dy slope of a straight segment, the canonical slope of the segment, which is a value in [−0.5−+0.5] range, may be determined.

Canonical slope may be determined by subtracting the rounded part from the angle dx/dy. For example, the segment 610 of FIG. 7 has a slope of 4/3, which is canonical slope 4/3−round(4/3)=4/3−1=0.3333.

As another example: a slope of 5/3 would have canonical slope 5/3−round(5/3)=5/3−2=−0.3333.

A minor link pattern may be determined. For a canonical slope dx/dy of −0.149, for example, successive coefficients of a continued fraction approximation of the slope value dx/dy may be determined. The integer part of the continued fraction is zero (0). A first coefficient of the continued fraction is called Order_0, and is calculated as follows:

Order_0=round($dy/dx$)=round(1/−0.149)=
round(−6.7114)=−7

Therefore, order_0 is −7, its length is abs(−7)=7, Order_0 slope is −1/7. Further, the corresponding sequence of links is: {00000−+} which represents the offset of −1 dx per seven (7) scanlines.

The −+ order of links in minor link pair indicates that the slope is <0 The slope may be uniquely represented by the continued fraction of single coefficient [;−7].

A second coefficient of continued fraction is called Order_1, and is calculated as follows:

Order_1=round(1/Order_0 leftover)=
round((−7)−(−6.7114))=round(1/−0.2886)=−3.48

Therefore, order_1 is −3, its length is abs(−3)=3, Order_1 slope is 1/−(7+1/−3)=−3/20.

The corresponding sequence of links is:
{(00000−+)(00000−+)(0000−+)}
which represents the offset of −3 dx per twenty (20) scanlines. The slope may be uniquely represented by the continued fraction of two coefficients [;−7, −3]

A third coefficient of the continued fraction is called Order_2, and is calculated as follows:

Order_2=round(1/Order_1 leftover)=
round((−3)−(−3.48))=round(1/0.48)=2.15

Order_2 is 2, its length is 2,Order_2 slope is
1/−(7+1/−(3+½))=−7/47.

The corresponding sequence of links is:
{[(00000−+)(00000−+)(0000−+)]
[(00000−+)(00000−+)(00000−+)(0000−+)]}
which represents the offset of −7 dx per forty-seven (47) scanlines. The slope may be uniquely represented by the continued fraction of three coefficients [;−7, −3, 2]. However, the continued fraction of three coefficients [;−7, −3, 2] is not the only possible representation of the −7/47 slope. For example, 1/−(7+1/−(4−½))=−7/47, which means the −7/47 slope maybe represented by the continued fraction of three coefficients [;−7, −4, −2], which would be found if −4 was chosen as the Order_1 approximation, with a corresponding sequence of links:

{[(00000−+)(000000−+)(000000−+)(00000−+)]
[(00000−+)(000000−+)(00000−+)]}
which is the same sequence with phase shift φ=20 (i.e., Order_1 sub-cycles swapped).

The calculation of successive coefficients of a continued fraction approximation of slope value dx/dy is stopped when order-n becomes accurate enough approximation of the slope value. The accuracy of such an approximation of the sequence of given length maybe estimated by calculating the next order of precision. In the example above, order_3 may be determined as follows:

Order_3=round(1/Order_2 leftover)=
round(1/(−0.1489−(−0.149))=
round(1/0.0001)=10000.

Odrer_3 is a relatively large value compared to previous coefficients, and the approximate length of the corresponding sequence of links is 47*10000=470000. Therefore, calculation can be stopped at Order_2, with an Order_2 slope approximation accurate enough to encode the segment spanning up to approximately 470000 scanlines. In other words, the precision level of Order_2 is suitable for encoding a sequence representing the vector segment that intersects with about 47000 scanlines. Depending on the desired error tolerance, the length of the approximated segment maybe somewhat longer than the maximum calculated above. For example, the approximated segment may be up to 500,000 scanlines long (or even twice that much).

Resulting approximations of the above example are summarised in Table 2, below. The numerator in each slope approximation is a number of minor link pairs ("+−" or "−+") in the sequence, a measure of dx. The denominator in each slope approximation is the length of link sequence, a measure of dy. The sequence of Order_n, is composed of Order_n sub-sequences of Order_(n−1), with a last subsequence containing one more (or one less) major element of Order_(n−2), when Order_n has plus (minus) sign.

For example, for Alt-Order_2, there are two (2) sub-sequences of Order_1 (00000−+)(00000−+) (00000−+)(0000−+). However, the second subsequence is shorter by one (00000−+) element, because Alt-Order_2<0.

For Order_2, there are again two (2) sub-sequences of Order_1. However, the last subsequence is longer, because Order_2>0.

For Order_1, there are three (3) sub-sequences of Order_0 (00000−+). However, the last sub-sequence is one element '0' shorter, because Order_1<0. Major link "0" may be "Order_−1" in this context.

In Table 2, extra (or missing) sub-sub-sequences are marked as underline. Order_0 does not have a "last subsequence" because the concept of "Order_−2" is not defined.

TABLE 2

Link sequence approximations for canonical slope of −0.149

| Original slope (dx/dy) −149/1000 | Slope approximation | Slope sequence encoding | Link sequence |
|---|---|---|---|
| Order_0 = −7 | $\frac{-1}{7}$ | [;−7] | (00000−+) |

TABLE 2-continued

Link sequence approximations for canonical slope of −0.149

| Original slope (dx/dy) −149/1000 | Slope approximation | Slope sequence encoding | Link sequence |
|---|---|---|---|
| Order_1 = −3 | $\dfrac{-1}{7-\dfrac{1}{3}} = \dfrac{-3}{20}$ | [;−7, −3] | (00000−+)<br>(00000−+) |
| Order_2 = 2 | $\dfrac{-1}{7-\dfrac{1}{3+\dfrac{1}{2}}} = \dfrac{-7}{47}$ | [;−7, −3, 2] | (00000−+)(00000−+)(0000−+)<br>(00000−+)(00000−+)(00000−+)(0000−+) |
| Alt-Order_2 = −2 (if order 1 changed from −3 to −4) | $\dfrac{-1}{7-\dfrac{1}{4-\dfrac{1}{2}}} = \dfrac{-7}{47}$ | [;−7, −4, −2] | (00000−+)(00000−+)(00000−+)(0000−+)<br>(00000−+)(00000−+)_____(0000−+) |

Once Order_n has been established as a best approximation, a straight segment approximation may be encoded as a sequence of n+1 integer numbers [;Order_0, Order_1, . . . Order_n], plus an extra number indicating total length of a segment. Total length of the segment is any number larger than the denominator of maximum order, over which the sequence of links is periodically repeated.

Where accurate representation of pixels is required, phase shift $\phi$ may be necessary to encode. If phase shift is not to be encoded; then, phases are assumed to be zero (0). Where a particular segment cannot be encoded with phase shift $\phi=0$, the segment description may be split into two (2) segment encodings.

Table 3, below, represents encodings required to encode edge 600 from FIGS. 6 and 7 in both traditional offset encodings and a "Mixed encoding" according to the arrangement above.

TABLE 3

Edge offset encoding (prior art) vs mixed edge encoding.

| Offset encoding | Mixed encoding |
|---|---|
| OPEN, xo, yo, len = 15 | OPEN, xo, yo, len = 15 |
| ADV1 | SLP1 |
| ADV4 | SLP + 3 |
| ADV3 | SLP − 1 |
| ADV1 | SLP − 2 |
| ADV2 | SLOPEo(3) len = 9 |
| ADV1 | |
| ADV1 | |
| ADV2 | |
| ADV1 | |
| ADV1 | |
| ADV1 | |
| ADV1 | |
| ADV2 | |
| ADV1 | |
| ADV1 | |

Figure 11:
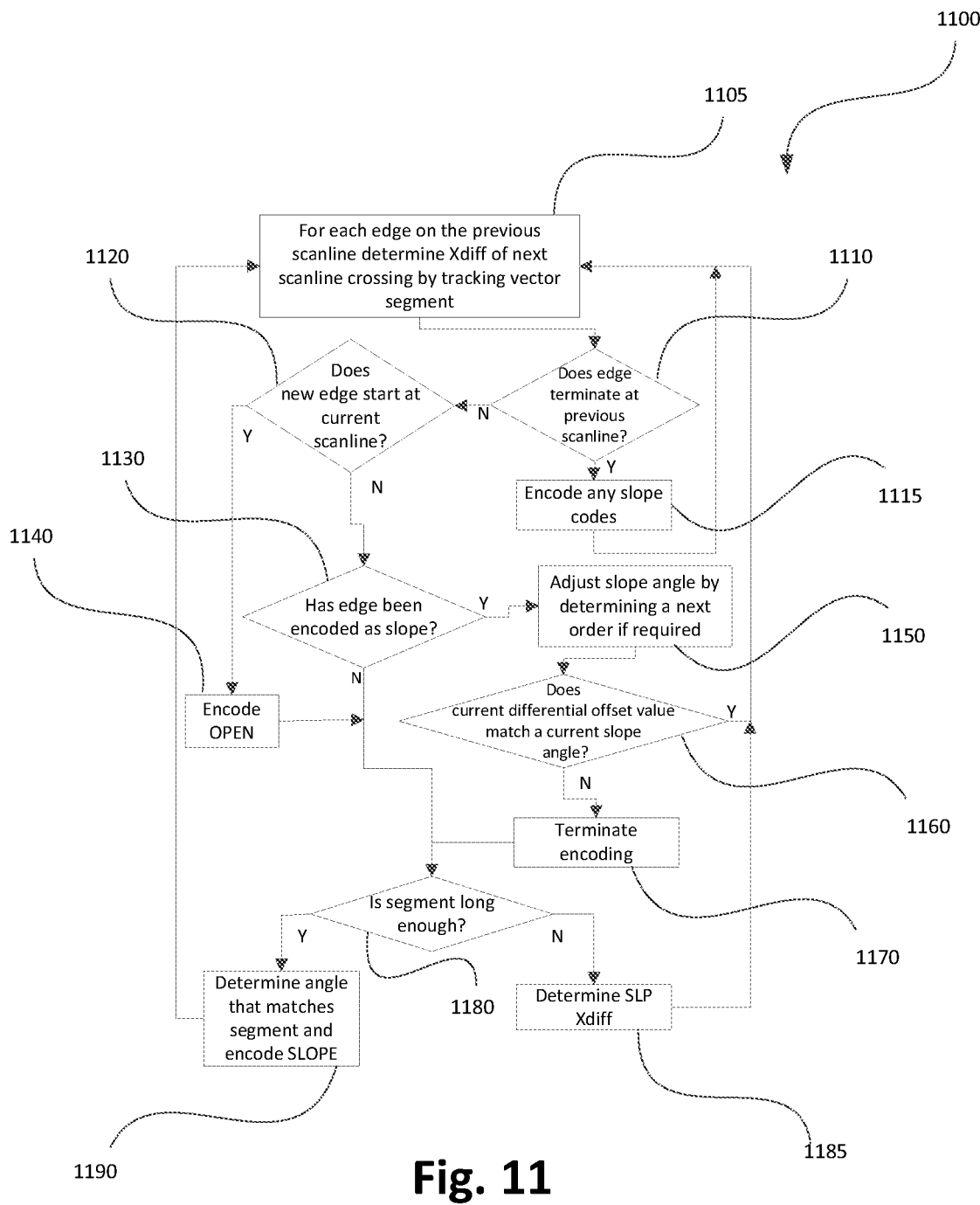
FIG. 11 is a flow diagram showing a method of converting vector edges to pixel aligned output edges, according to a scan-based edge encoding (SBEE) arrangement.

A method 1100 of encoding input vector edges of a graphical object as pixel aligned output edges, will now be described with reference to FIG. 11. The edges may be encoded in a PDL rendering command.

The method 1100 is a scan based edge encoding (SBEE) method. Prior to execution of the method 1100, each of the edges are processed by segmenting the edge represented as spline curve, into a plurality of straight segments. Various algorithms exist for converting a spline to an approximating sequence of straight segments. One such method defines that the maximum distance between a spline curve and an approximating chord is bounded by a number proportional to the upper bound of the norm of the second derivative of the spline over the interval concerned. They then show how to calculate a number of subdivisions of the spline to guarantee that the maximum error is within a required tolerance. Another method can be the recursive subdivision of a spline into flat splines using the de Casteljau algorithm. Any such method can be parametrized with user-defined error tolerance, to produce the minimal number of segments required to guarantee the maximum error be within said error tolerance. The advantage of a smaller number of line segments is that the memory usage required for an encoding of a graphical object is smaller and the rasterization process executed faster.

The method 1100 performs steps for determining a sequence of differential offset values representing one of the plurality of segments from a starting position. The SBEE method 1100 rasterises edges of the graphical object in scan-line-sequential order in one pass. During rasterisation, a best SLOPE code, representing a series of differential offset values (XDiff), is searched. Alternatively, SLP codes may be generated for the differential offset values (XDiffs) that cannot be represented as SLOPE codes. The method 1100 may be implemented as one or more of the software code modules forming the client print manager module 181, resident in the memory 190 and being controlled in their execution by the processor 170.

The method 1100 begins at determining step 1105, where the client print manager module 181, under execution of the processor 170, determines the differential offset values (XDiff) from a previous scanline to a current scanline. The differential offset values determined at step 1105 may be stored within the memory 190. Step 1105 is executed for each scanline crossing at all object edges in Y-X order.

Then at decision step 1110, the client print manager module 181, under execution of the processor 170, determines if there is any edge that terminates at the previous scanline. If the client print manager module 181 determines that there is an edge that terminates on the previous scanline, then the method 1100 proceeds to encoding step 1115. Otherwise, the method 1100 proceeds to decision step 1120.

The terminated edge may require the encoding of SLOPE codes, if the terminated edge is carrying any SLOPE codes.

Accordingly, at encoding step 1115, the client print manager module 181, under execution of the processor 170, encodes any SLOPE codes for the terminated edge. Once all terminated edges are finished being encoded, the method 1100 proceeds to step 1120.

At decision step 1120, if a new edge starts at the current scanline, then the method 1110 proceeds to step 1140 where an OPEN new edge is encoded. In such a case, there is no SLOPE encoding to be extended.

Otherwise, if no new edge starts at the current scanline, then the method 1100 proceeds to step 1130 with an existing edge as argument.

At decision step 1130, if the client print manager module 181 determines that the existing edge has not been encoded as SLOPE code, then the method 1100 proceeds to step 1180. Otherwise, the method 1100 proceeds to step 1150.

At decision step 1180, if the client print manager module 181, under execution of the processor 170, determines that the current segment is long enough to open new SLOPE encoding, then the method 1100 proceeds to step 1190. In other words, the decision step 1180 determines if the segment satisfies the predetermined precision level required for encoding the vector segment. The precision level for a sequence for edge encoding is equivalent to the precision level of the sequence for pixel mapping as described previously. This precision level for the sequence for edge encoding may also be a user defined value, or is determined by the number of scanlines intersected by the vector segment. If the segment is long enough, i.e. exceeding the length defined by the precision level, then the processor 105 proceeds to determining step 1190. At determining step 1190, a first approximation of the angle of the current segment is determined and a SLOPE code is determined for the current segment.

Otherwise, if the current segment is determined not to be long enough at step 1180, then no SLOPE encoding is opened and the method 1100 proceeds to step 1185. At step 1185, an SLP differential offset value (XDiff) is calculated for the current segment and the SLP differential offset value (XDiff) is stored in the memory 190 before the method 1100 returns to step 1105. In other words, if the segment is smaller than the length defined by the precision level, then the processor 105 proceeds to determining step 1185 and calculates the SLP differential offset value (XDiff). Thus, the calculation and modification of the differential offset value is dependent on the precision level, and indirectly dependent on the number of scanlines that are intersected by the segment.

At step 1150, the current differential offset value (XDiff) is matched with a current SLOPE angle. If required, the SLOPE angle may be adjusted by determining a next order to match the next differential offset value (XDiff) exactly.

Then at step 1160, if the client print manager module 181 determines that the current differential offset value (XDiff) is matched with a current SLOPE angle as a result of step 1150, there is nothing to encode and the method 1100 returns to step 1105. Otherwise, the encoding of the current SLOPE code needs to be terminated because the current SLOPE code cannot be extended any longer, and the method 1100 proceeds to step 1170. Accordingly, at step 1170, the encoding of the current SLOPE code is terminated.

Then the method 1100 proceeds to decision step 1180, where the length of the rest of the current segment is evaluated and a new SLOPE code started or an SLP code encoded.

At the next execution of step 1105, the differential offset of the next edge in scanline-sequential order is examined. The method 1100 is executed until all scanlines have been processed. A method 1000 of encoding input vector edges of a graphical object as pixel aligned output edges, will now be described with reference to FIG. 10. Prior to execution of the method 1000, each of the edges may be processed by segmenting the edge into a plurality of straight segments. The method 1000 is a scan based edge approximation (SBEA) pixel sequential conversion method. The SBEA method 1000 determines length, starting point and ending point of non-overlapping edge segments.

Starting and ending pixels of each long segment are determined according to the pixel placement rule. Then, intermediate pixels of long segments are approximated with continued fractions and encoded with SLOPE codes. For short segments, each pixel is determined and encoded using SLP encoding. The method 1000 may be implemented as one or more of the software code modules forming the client print manager module 181, resident in the memory 190 and being controlled in their execution by the processor 170.

The method 1000 begins at determining step 1005, where the client print manager module 181 determines a next non-overlapping segment (i.e., "current segment") from an input set of edges in pixel sequential order of segment starting points. Step 1005 is executed for each scanline crossing at all object edges in Y-X order.

Then, at decision step 1010, the client print manager module 181 determines if the current segment is long. If the current segment is determined to be long, then the method 1000 proceeds to step 1030. Otherwise, the method 1000 proceeds to step 1020.

At rasterising step 1020, the client print manager module 181, under execution of the processor 170, rasterises the current segment. Also at step 1020, the client print manager module 181 encodes the series of XDiff offset differential values for the current segment with a series of SLP code values.

If the current segment is determined to be long, then the segment should be encoded as a continued fraction. Accordingly, at determining step 1030, the client print manager module 181, under execution of the processor 170, determines the location of the first pixel on a current edge of the current segment. The location of the first pixel is determined according to the pixel placement rule. The client print manager module 181 then determines the last offset from the previous segment of the current edge and compares the last offset with the offset determined for the first pixel. If the last differential offset is different to the differential offset determined for the first pixel, then a single differential offset value is encoded with an SLP code.

Then at approximating step 1040, the client print manager module 181, under execution of the processor 170, determines successive approximations of a continued fraction representing the SLOPE angle (dx/dy) of the current segment, as described above. If required, the SLOPE angle (dx/dy) may be adjusted by determining a next order to match the next differential offset value (XDiff) exactly.

At step decision 1050, if the order determined at step 1040 gives enough approximation to angle of the current segment, then the method 1000 proceeds to step 1060. Otherwise, the method 1000 returns to step 1040 to determine a next order.

At encoding step 1060, the SLOPE code for the current segment is encoded as a continued fraction based on a given order and length.

Then at terminating step 1070, the encoding of the SLOPE code is terminated and the determined SLOPE code may be stored within the memory 190. The execution of the method 1000 returns to step 1005 where a next segment is fetched. The method 1000 is executed until all segments have been exhausted.

Figure 12:
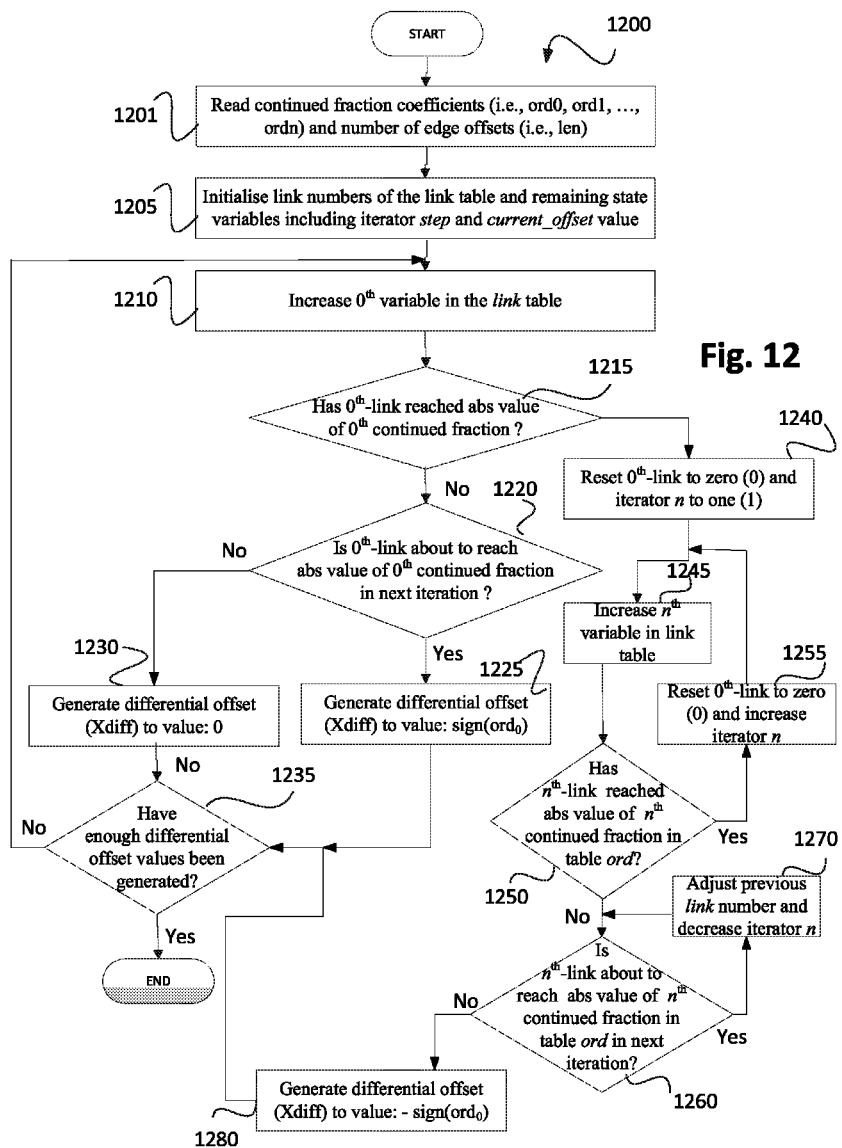
FIG. 12 is a flow diagram showing a method of decoding a pixel aligned edge encoded in accordance with the method of FIG. 10 or the method of FIG. 11.

A method 1200 of decoding a pixel aligned edge encoded in accordance with the SBEE method 1100 or SBEA method 1000, will now be described with reference to FIG. 12. The method 1200 may be implemented as one or more of the software code modules forming the client print manager module 181, resident in the memory 190 and being controlled in their execution by the processor 170. The method 1200 produces a set of differential offset values.

The method 1200 uses the following state variables:

a table "ord" of continued fraction coefficients $ord_0$, $ord_1, \ldots, ord_{n+1}$ containing values encoded in an input stream, a table "link" of numbers $link_0, link_1, \ldots, link_{n+1}$ containing current link numbers corresponding to coefficients in the table ord, current_offset—an offset value to which differential offset values obtained by decoding a continued fraction, as described above, will be added to obtain an absolute offset, len—total number of edge offsets encoded, step—iterator that counts the number of differential offset values generated, and n—iterator over tables ord and link.

The method 1200 begins at encoding step 1201, where the client print manager module 181, under execution of the processor 170, reads the continued fraction coefficients (i.e., ord0, ord1, . . . , ordn) and number of edge offsets (i.e., len) encoded for the edge. The continued fraction coefficients and number of edge offsets may be read from the memory 190. If the length of the encoded continued fraction is less than the value of the iterator n, then respective ord values (i.e., $ord_0$, $ord_1, \ldots, ord_{n+1}$) of the ord table are set to zero (0) at step 1201. Then at initialising step 1205, link numbers (i.e., of the link table and remaining state variables including iterator step and current_offset value are set to zero (0) (i.e., Initialise values, $ord_{n+1}=0$, $link_0=link_1=\ldots=link_{n+1}=0$, step=0; current_offset=0).

At next step 1210, the client print manager module 181, under execution of the processor 170, records that one differential offset value is about to be generated by increasing the $0^{th}$ variable in the link table, referred to below as "$0^{th}$-link" (i.e., $link_{0++}$).

Then at decision step 1215, if the client print manager module 181 determines that the $0^{th}$-link reached an absolute value of the $0^{th}$ continued fraction in the table ord (i.e., $link_0==|ord_0|$), then the method 1200 proceeds to step 1240. Otherwise, the method 1200 proceeds to step 1220.

In steps 1240 to 1270, link numbers in the table link are updated.

At decision step 1220, if the client print manager module 181 determines that the $0^{th}$-link in the table link is about to reach the absolute value of the $0^{th}$ continued fraction in the table ord in the next iteration (i.e., $link_0==|ord_0|-1$), then the method 1200 proceeds to step 1225. Otherwise, the method 1200 proceeds to generating step 1230 where the differential offset (Xdiff) of value zero (0) is generated, meaning that a current_offset value is output. The current_offset value may be stored in the memory 190.

At generating step 1225, the differential offset (Xdiff) of value +1 or −1 is generated by the client print manager module 181, depending on the sign of the $0^{th}$ coefficient stored in table ord. In particular, $sign(ord_0)$ is added to the current_offset value and output. The differential offset value (Xdiff) may be stored in the memory 190.

Either step 1230 or step 1225 generate a single differential offset value.

Then at decision step 1235, the client print manager module 181, under execution of the processor 170, determines if enough differential offset values have been generated. In particular, at step 1235, if the step variable, after being incremented, reaches len value (i.e., ++step==len) then the method 1200 concludes. Otherwise, the execution of the method 1200 returns to step 1210 to output more differential offset values.

At resetting step 1240, the $0^{th}$-link is reset back to zero (0) (i.e., $link_0=0$) and the iterator n is set to one (1) (i.e., n=1) to indicate that the link number one (1) needs to be updated.

Then in increasing step 1245, the $n^{th}$ variable in link table (i.e., referred to below as $n^{th}$-link), is increased (i.e., $link_n++$).

At decision step 1250, if the client print manager module 181, under execution of the processor 170, determines that the $n^{th}$-link has reached the absolute value of the corresponding $n^{th}$ continued fraction in table ord (i.e., $link_n==|ord_n|$), then the method 1200 proceeds to step 1255. Otherwise, the method 1200 proceeds to step 1260. The absolute value of the corresponding $n^{th}$ continued fraction represents the precision level as described above. At resetting step 1255, the client print manager module 181 resets the $n^{th}$-link value and the next link is updated. In particular, at step 1255, the $n^{th}$-link value is reset to zero (0) (i.e., ($link_n=0$) and the iterator n is increased (i.e., n++). After step 1255, the method 1200 returns to step 1245.

At decision step 1260, if the client print manager module 181 determines that the $n^{th}$-link is about to reach the absolute value of the $n^{th}$ continued fraction in table ord in a next iteration (i.e., $link_n==|ord_n|-1$), then the method 1200 proceeds to step 1270. Otherwise, the method 1200 proceeds to step 1280.

At adjusting step 1270, the value of previous link number (i.e., $n-1^{th}$ variable in link table) is adjusted by the sign of the $n^{th}$ coefficient stored in table ord (i.e., $link_{n-1}=link_{n-1}-sign(ord_n)$), and the iterator n is decremented. After step 1270, the method 1200 returns to step 1260 in order to check if $n^{th}$-link is about to reach the absolute value of the $n^{th}$ continued fraction. The adjustment in step 1270 is repeated until the method 1200 proceeds from step 1260 to step 1280.

Execution of step 1280 results in an extra subsequence being added or removed from the current sequence of link numbers, according to the sequence formation described above with reference to Table 2.

At generating step 1280, the differential offset (Xdiff) of value −1 or +1 (i.e., Xdiff-sign($ord_0$)) is generated by the client print manager module 181, depending on the sign of $0^{th}$ coefficient stored in table ord. In particular, at step 1280, the −sign($ord_0$) is added to the current_offset value configured within memory 190. Following step 1280, the method 1200 proceeds to step 1235.

When a single differential offset value Xdiff has been encoded in an edge description, a current_offset value is updated by the differential offset value (Xdiff).

With the starting point of the pixel aligned edge and offset values as described above, any suitable method may be used to render the pixels described by the pixel aligned edge.

INDUSTRIAL APPLICABILITY

It is apparent from the above that the arrangements described are applicable to the computer image processing industry.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of encoding an edge of a graphical object, said method comprising:
   segmenting the edge into a plurality of straight segments;
   determining a sequence of offset values representing one of the plurality of segments from a starting position;
   modifying at least one of the offset values in the sequence to obtain a modified sequence of offset values; and
   determining a precision level at which the modified sequence is to be encoded to represent the segment, wherein said precision level determines a size of a portion of offset values to be repeated in the sequence of offset values.

2. The method according to claim 1, wherein the edge is encoded in a rendering command.

3. The method according to claim 1, wherein said segmenting of the edge is dependent on an error tolerance at which the edge is to be rendered.

4. The method according to claim 1, wherein the precision level is determined by a user defined value.

5. The method according to claim 1, wherein the precision level is determined by a number of scanlines intersected by the segment.

6. The method according to claim 1, wherein said modifying of the offset value is determined by a number of scanlines intersected by the segment.

7. A method of encoding a scaling factor of an image, said method comprising:
   determining a sequence of pixel mapping values representing the scaling factor;
   modifying at least one pixel mapping value in the sequence of pixel mapping values to obtain a modified sequence of pixel mapping values; and
   determining a precision level at which the modified sequence is to be encoded to represent the scaling factor, wherein said precision level determines a size of a portion of offset values to be repeated in the sequence of pixel mapping values.

8. The method according to claim 7, wherein the pixel mapping values are encoded in a rendering command.

9. The method according to claim 7, wherein the precision level is determined by a user defined value.

10. The method according to claim 7, wherein the precision level is determined by a scaling factor of the source image in the x-direction.

11. The method according to claim 7, wherein the precision level is determined by a scaling factor of the source image in the y-direction.

12. The method according to claim 7, wherein said determining of said precision level comprises the steps of:
   determining a first phase region and a second phase region for a first pixel mapping sequence, said second phase region adjacent to said first phase region and said first phase region containing the sub pixel origin of the image;
   determining the boundary between first and second adjacent phase regions of the first pixel mapping sequence;
   determining a third phase region and a fourth phase region for a second pixel mapping sequence; and
   determining the precision level having said boundary overlapping the third phase region of the second pixel mapping and the sub pixel origin of the image overlapping the fourth region of the second pixel mapping.

13. A system for encoding an edge of a graphical object, said system comprising:
   a memory for storing data and a computer program;
   a processor coupled to said memory for executing said computer program, said computer program comprising instructions for:
      segmenting the edge into a plurality of straight segments;
      determining a sequence of offset values representing one of the plurality of segments from a starting position;
      modifying at least one of the offset values in the sequence to obtain a modified sequence of offset values; and
      determining a precision level at which the modified sequence is to be encoded to represent the segment, wherein said precision level determines a size of a portion of offset values to be repeated in the sequence of offset values.

14. A non-transitory computer readable medium having a computer program recorded thereon for encoding an edge of a graphical object, said program comprising:
   code for segmenting the edge into a plurality of straight segments;
   code for determining a sequence of offset values representing one of the plurality of segments from a starting position;
   code for modifying at least one of the offset values in the sequence to obtain a modified sequence of offset values; and
   code for determining a precision level at which the modified sequence is to be encoded to represent the segment, wherein said precision level determines a size of a portion of offset values to be repeated in the sequence of offset values.

* * * * *